(12) United States Patent
Shimizu et al.

(10) Patent No.: US 8,508,776 B2
(45) Date of Patent: Aug. 13, 2013

(54) IMAGE PROCESSING APPARATUS, IMAGE FORMING SYSTEM AND NON-TRANSITORY COMPUTER READABLE MEDIUM THAT CHANGES ASSIGNMENT PROCESS BASED ON WHETHER A DRP OF A FINAL STAGE IN THE DRPS IS DISCONNECTED

(75) Inventors: Tatsuji Shimizu, Kanagawa (JP); Tsutomu Nagaoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 475 days.

(21) Appl. No.: 12/853,505

(22) Filed: Aug. 10, 2010

(65) Prior Publication Data

US 2011/0235094 A1    Sep. 29, 2011

(30) Foreign Application Priority Data

Mar. 24, 2010  (JP) ................................ 2010-067233

(51) Int. Cl.
*G06F 3/12*    (2006.01)
(52) U.S. Cl.
USPC ........................................ 358/1.15; 358/1.13
(58) Field of Classification Search
USPC ............................................... 358/1.13, 1.15
See application file for complete search history.

(56) References Cited

U.S. PATENT DOCUMENTS

2006/0061794 A1* 3/2006 Ito et al. .................... 358/1.13
2009/0251732 A1* 10/2009 Igarashi ..................... 358/1.15

FOREIGN PATENT DOCUMENTS

JP    A-2001-260439    9/2001

* cited by examiner

*Primary Examiner* — Benny Q Tieu
*Assistant Examiner* — Juan M Guillermety
(74) *Attorney, Agent, or Firm* — Oliff & Berridge, PLC

(57) ABSTRACT

An image processing apparatus including: an assignment portion that, when a plurality of dynamic reconfigurable processors (DRPs) execute image processes by a pipeline process mode based on a print job, assigns identification numbers identifying the DRPs to the DRPs based on the number of DRPs; a first change portion that changes an assignment process by the assignment portion, based on whether a DRP of a final stage in the DRPs is connected to an outputting portion, the outputting portion outputting the results of the image processes to an outside; and a second change portion that, when the DRP of the final stage in the DRPs is disconnected from the outputting portion, further changes the assignment process by the assignment portion based on whether the DRPs are placed on only a single substrate.

11 Claims, 20 Drawing Sheets

FIRST NUMBER GIVING PROCESS

SECOND NUMBER GIVING PROCESS

IMAGE PROCESSING APPARATUS, IMAGE FORMING SYSTEM AND NON-TRANSITORY COMPUTER READABLE MEDIUM THAT CHANGES ASSIGNMENT PROCESS BASED ON WHETHER A DRP OF A FINAL STAGE IN THE DRPS IS DISCONNECTED

CROSS-REFERENCE TO RELATED APPLICATION

This application is based on and claims priority under 35 USC 119 from Japanese Patent Application No. 2010-067233 filed on Mar. 24, 2010.

BACKGROUND (i) Technical Field

The present invention relates to an image processing apparatus, an image forming system, and a non-transitory computer readable medium.

(ii) Related Art

The operation of an image forming apparatus is controlled by a controller. To execute an image process at high-speed, an exclusive drawing processor (e.g. ASIC (Application Specific Integrated Circuit)) or a drawing processor that is called a dynamic reconfigurable processor (hereinafter simply referred to as "DRP") is installed in the controller. The DRP fulfills various functions relating to the image process by the control of a CPU (Central Processing Unit).

The CPU activates the DRP by either of a pipeline process mode or a reconfiguration process mode. When the DRPs are configured in plural stages for example, the CPU causes each DRP to fulfill a single image process function in the pipeline process mode. Therefore, when image information is input to the image forming apparatus, a single image process is executed with the single DRP. Then, when the single image process is terminated, a next image process is executed with another DRP. On the other hand, in the reconfiguration process mode, when image information is input to the image forming apparatus, the CPU sequentially switches image process functions for the single DRP, and hence the single DRP executes image processes.

SUMMARY

According to an aspect of the present invention, there is provided an image processing apparatus including: an assignment portion that, when a plurality of dynamic reconfigurable processors (DRPs) execute image processes by a pipeline process mode based on a print job, assigns identification numbers identifying the DRPs to the DRPs based on the number of DRPs; a first change portion that changes an assignment process by the assignment portion, based on whether a DRP of a final stage in the DRPs is connected to an outputting portion, the outputting portion outputting the results of the image processes to an outside; and a second change portion that, when the DRP of the final stage in the DRPs is disconnected from the outputting portion, further changes the assignment process by the assignment portion based on whether the DRPs are placed on only a single substrate.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of an exemplary embodiment of the present invention.

Figure 1:
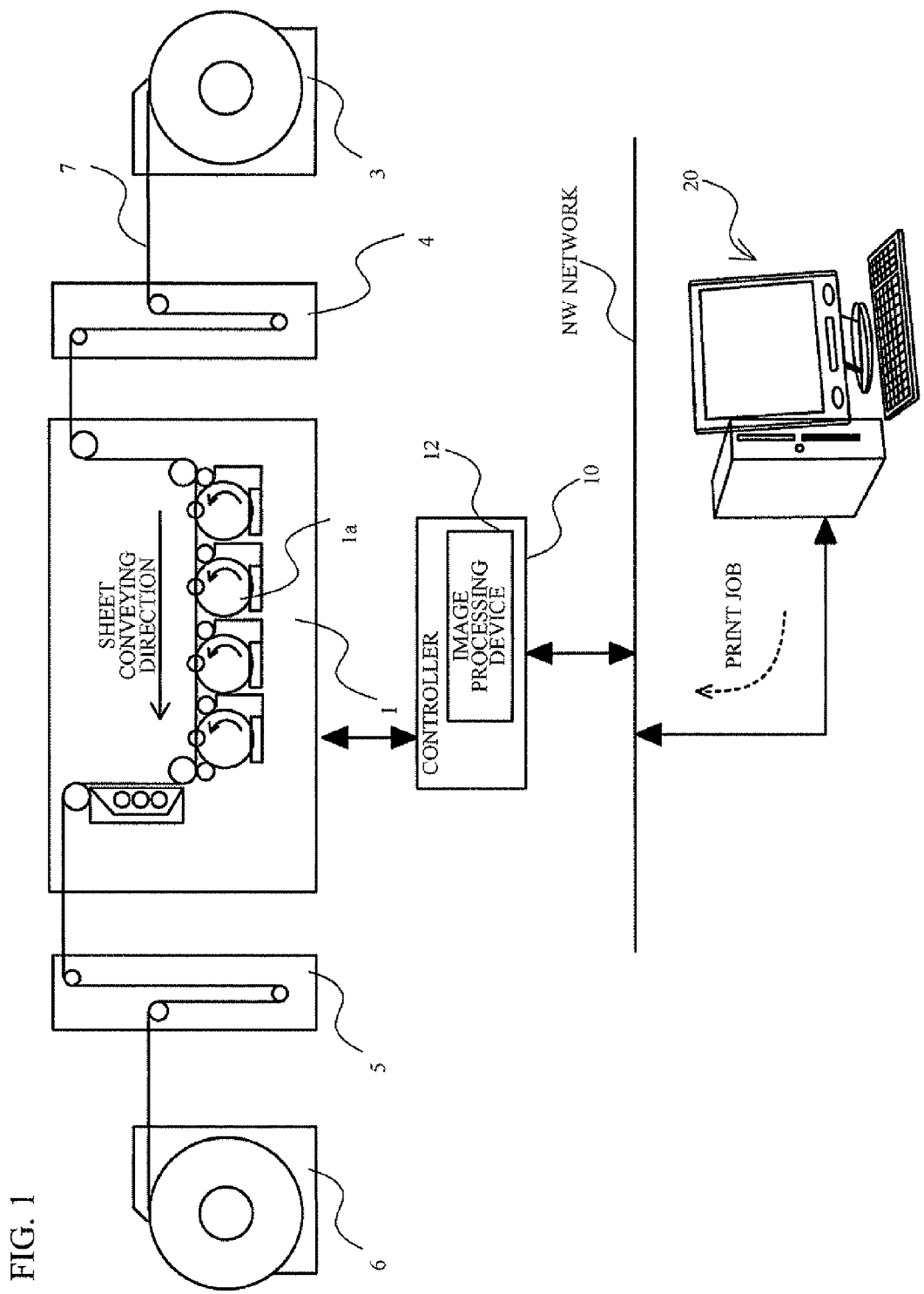
FIG. 1 is a diagram showing an example of the construction of an image forming system.

FIG. 1 is a diagram showing an example of the construction of an image forming system. The image forming system includes an image forming apparatus 1, a preprocessing device 3, buffer devices 4 and 5, a post-processing device 6, a controller 10, and an outputting device 20, as shown in FIG. 1. The image forming apparatus 1 includes image outputting devices 1a composed of a photosensitive drum, an exposure device, an electrifying device, a transfer device, and so on, for example. An image forming method of the image forming apparatus 1 is not limited to such an electrophotographic method, and may be applied to an ink jet method. The controller 10 includes an image processing apparatus 12.

The image forming apparatus 1 forms an image according to image information on a sheet 7, based on the control of the controller 10. For instance, a printer functions as the image forming apparatus 1. The image information is output from the image processing apparatus 12.

The preprocessing device 3 feeds the sheet 7 on which the image has not been printed yet, to the image forming apparatus 1. The preprocessing device 3 holds the sheet 7 wound like a roll. The post-processing device 6 receives the sheet 7 fed from the image forming apparatus 1, and winds up the sheet 7 like a roll. The buffer devices 4 and 5 absorb a difference between a feeding speed of the sheet 7 in the preprocessing device 3 and the post-processing device 6, and a feeding speed of the sheet 7 in the image forming apparatus 1. By the buffer devices 4 and 5, constant tension is kept to the sheet 7, and the slack of the sheet 7 is controlled.

The outputting device 20 generates a print job to form the image on the sheet 7 with the image forming apparatus 1, based on the operation of a user. The outputting device 20 outputs the print job to the image processing apparatus 12 via a network NW. For instance, a personal computer functions as the outputting device 20. The controller 10 receives the print job output from the outputting device 20. The controller 10 converts the print job into the image information of a raster type with which the image forming apparatus 1 is capable of forming the image. The controller 10 outputs the image information to the image forming apparatus 1. It should be noted that the controller 10 may be configured inside the image forming apparatus 1.

Figure 2:
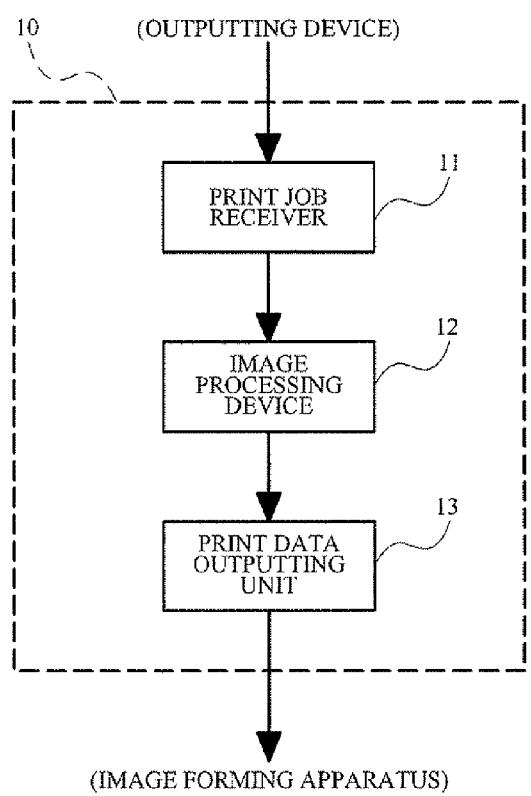
FIG. 2 is a block diagram of a controller.

FIG. 2 is a block diagram of the controller 10. The controller 10 includes a print job receiver 11, the image processing apparatus 12, and a print data outputting unit 13, as shown in FIG. 2.

The print job receiver 11 receives the print job output from the outputting device 20. The image processing apparatus 12 executes an image process to the print job received by the print job receiver 11, converts the print job into the image information of the raster type which the image forming apparatus 1 requests, and executes various image processes to the image information. The print data outputting unit 13 outputs the image information to which various image processes are executed, as print data, to the image forming apparatus 1.

Figure 3:
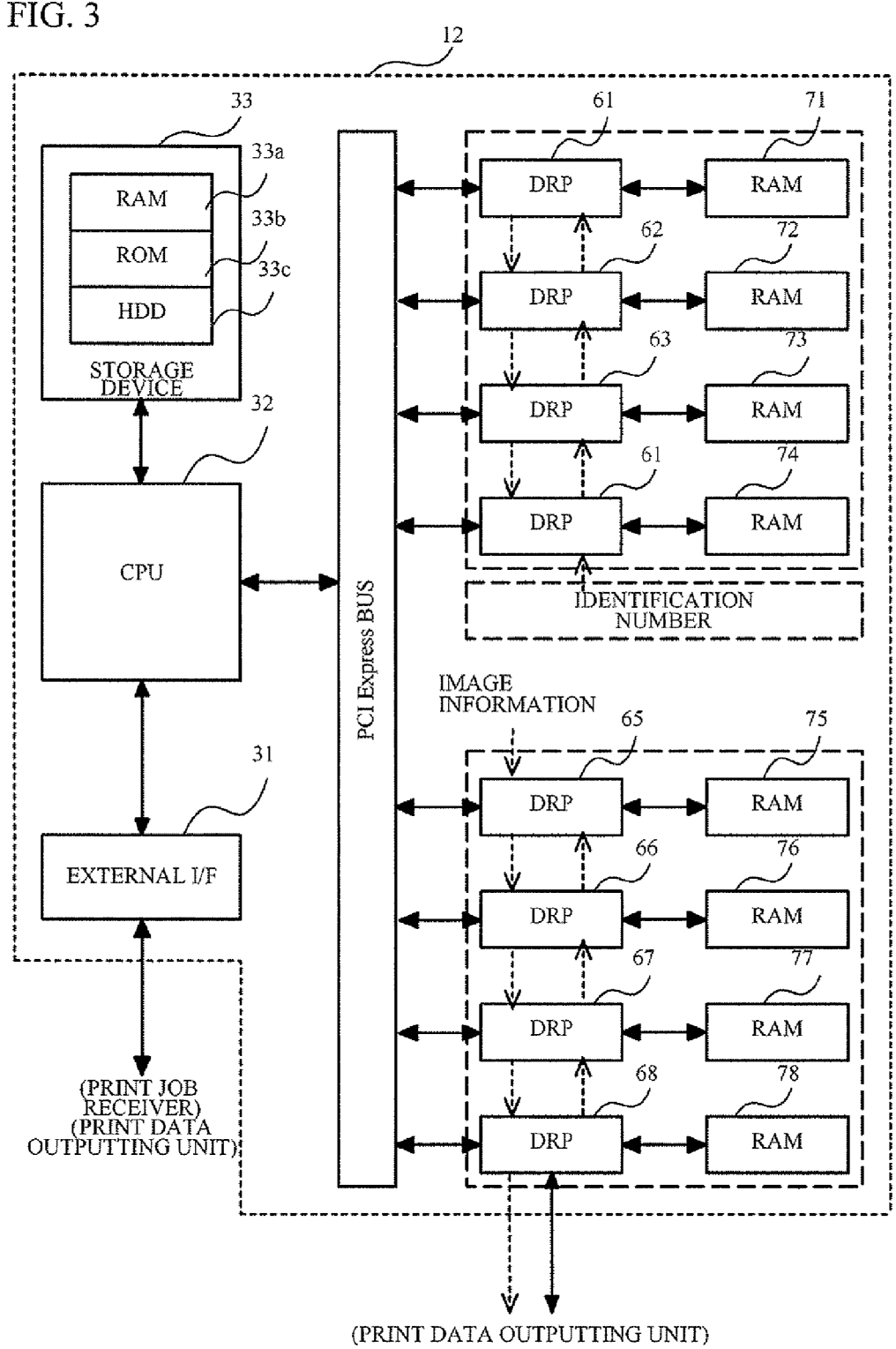
FIG. 3 is a diagram showing the hardware construction of an image processing apparatus.

FIG. 3 is a diagram showing the hardware construction of the image processing apparatus 12. The image processing apparatus 12 includes: a CPU 32 as an upper controller; RAMs 33a and 71 to 78 such as a SRAM (Static Random Access Memory), a DRAM (Dynamic RAM), a SDRAM (Synchronous DRAM), or a NVRAM (Non Volatile RAM), a DDR2SDRAM (Double Data Rate 2 SDRAM); a ROM (Read Only Memory) 33b such as a flash memory; a HDD (Hard Disk Drive) 33c; dynamic reconfigurable processors (DRPs) 61 to 66 connected to a PCI Express bus like a daisy chain; and an external interface (I/F) 31. The CPU 32 and the DRPs 61 to 68 are connected to each other via the PCI Express. The DRPs 61 to 68 are connected via wirings to transmit and receive identification numbers described later. The DRP 68 which is a final stage may be connected to the print data outputting unit 13 via the wiring.

When the CPU 32 as a computer receives the print job, the CPU 32 activates the DRPs 61 to 68. The CPU 32 loads a given program stored into a storage device 33 such as the ROM 33b or the HDD 33c, and executes calculation according to the given program, so that the activation of the DRPs 61 to 68 is realized. It should be noted that the given program may be a program according to a flowchart described later. The given program may be stored into a portable storage medium such as a CD-ROM, and be provided to the CPU 32.

Figure 4:
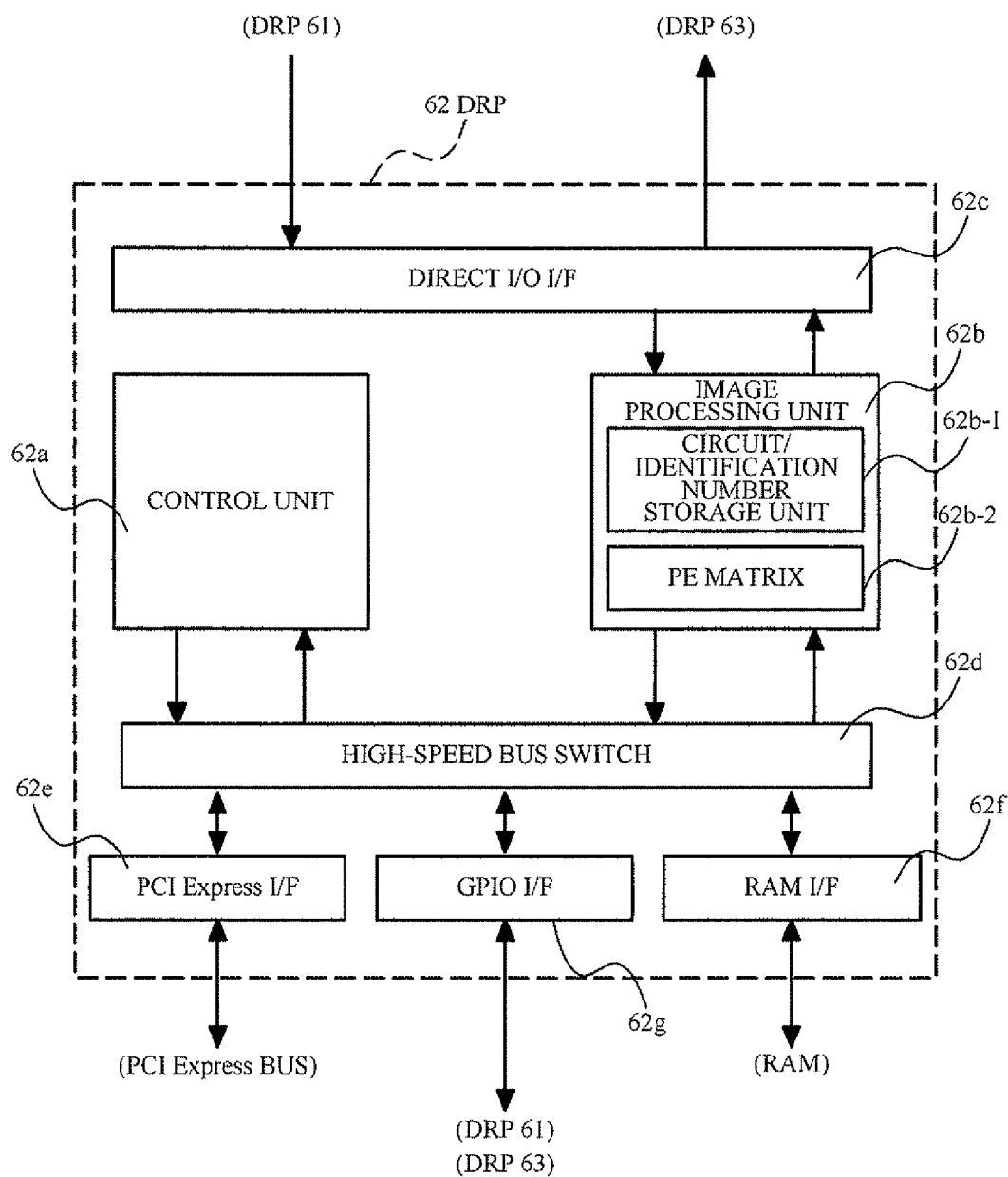
FIG. 4 is a block diagram of a dynamic reconfigurable processor (DRP)

FIG. 4 is a block diagram of a DRP 62. Since the DRPs 61, 63 to 68 has the same construction as the DRP 62, the description thereof will be omitted. The DRP 62 includes a control unit 62a, an image processing unit 62b, a direct I/O (Input/Output) interface 62c, a high-speed bus switch 62d, a PCI express interface (I/F) 62e, a RAM interface (I/F) 62f, and a general purpose input/output interface (GPIO I/F) 62g.

The control unit 62a operates based on the control from the CPU 32. The image processing unit 62b rewrite a PE (Processing Element) matrix 62b-2 based on the control of the control unit 62a, and realizes various image process functions. Circuits relating to the image processes to be realized are stored into a circuit/identification number storage unit 62b-1 (e.g. a register) in the image processing unit 62b. The circuit/identification number storage unit 62b-1 stores an identification number assigned by the CPU 32. The PE matrix 62b-2 is data for dynamically reconfiguring the circuits stored into the circuit storage unit 62b-1. The direct I/O I/F 62c receives the image information and the identification number from the DRP 61, and outputs the image information and identification number to the image processing unit 62b. The direct I/O I/F 62c outputs the image information in which various image processes are executed with the image processing unit 62b, to the DRP 63. The direct I/O I/F 62c transmits the image information from the DRP 61 to the DRP 63 via the DRP 62 by a pipeline process mode. Hereby, the image process is sequentially executed to the image information with each of the DRPs 61 to 68.

The high-speed bus switch 62d switches information channels between the control unit 62a or the image processing unit 62b, and the PCI express I/F 62e, the RAM I/F 62f or the GPIO I/F 62g, at high speed. The PCI express I/F 62e transmits and receives information to/from other circuit connected to the outside. The RAM I/F 62f transmits and receives information to/from the RAM 72. The GPIO I/F 62g transmits and receives the identification number of a general-purpose I/O, and is also used as an interface for transmitting and receiving the identification number described later to/from the DRPs 61 and 63. The GPIO I/Fs 62g of the DRPs 61 to 68 are connected to each other via the wirings. The GPIO I/Fs 62g may not be directly connected to each other, but indirectly connected to each other via a complex programmable logic device (CPLD) or the like.

Figure 5:
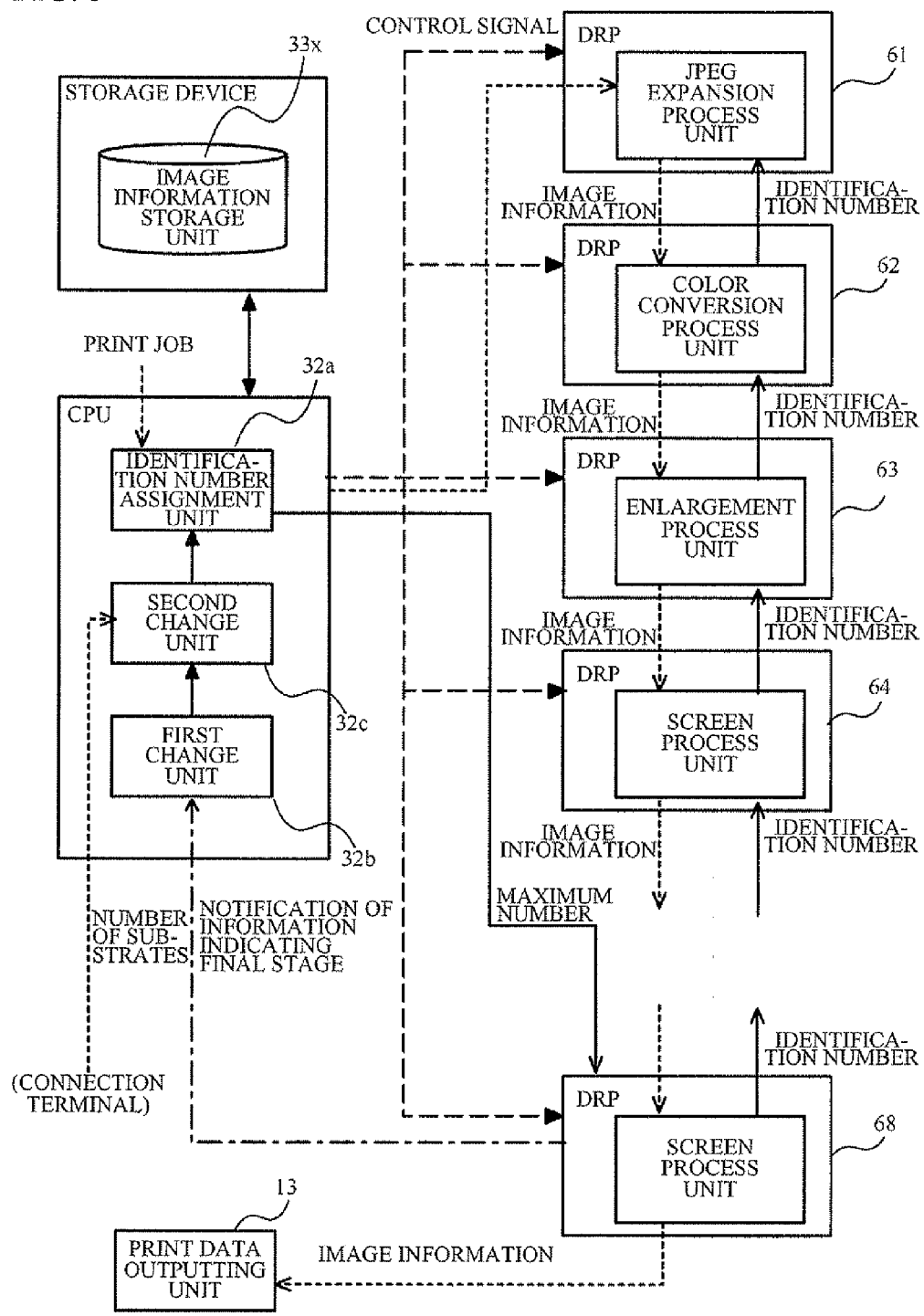
FIG. 5 is a functional block diagram of the image processing apparatus in a pipeline process mode.

FIG. 5 is a functional block diagram of the image processing apparatus 12 in a pipeline process mode. The pipelining process mode is paraphrased as a direct I/O process mode, a sequential process mode, or the like. The CPU 32 realizes an identification number assignment unit 32a, a first change unit 32b, and a second change unit 32c. The identification number assignment unit 32a, the first change unit 32b, and the second change unit 32c are realized by programs based on flowcharts described later.

When the identification number assignment unit 32a causes the DRPs 61 to 68 to execute the image processes based on the input print job by the pipeline process mode, the identification number assignment unit 32a assigns identification numbers for identifying the DRPs 61 to 68 to the DRPs 61 to 68 based on the number of DRPs 61 to 68. For example, the image processes are a JPEG (Joint Photographic Experts Group) expansion/compression process, a color conversion process, an enlargement process, a tone correction process, a tone reproduction control process, a screen process, and the like.

The first change unit 32b changes the assignment process executed by the identification number assignment unit 32a based on whether the DRP 68 which is the final stage in the DRPs 61 to 68 is connected to the print data outputting unit 13 outputting the process result of the image processes to the outside. Specifically, when the first change unit 32b judges that the DRP 68 is connected to the print data outputting unit 13, the first change unit 32b causes the identification number assignment unit 32a to execute a first assignment process described later.

The second change unit 32c further changes the assignment process executed by the identification number assignment unit 32a based on whether the DRPs 61 to 68 are located on only a single substrate when the DRP 68 which is the final stage in the DRPs 61 to 68 is connected to the print data outputting unit 13 outputting the process result of the image processes to the outside. Specifically, when the second change unit 32c judges that the DRPs 61 to 68 are located on only a single substrate, the second change unit 32c causes the identification number assignment unit 32a to execute a second assignment process described later. On the other hand, when the second change unit 32c judges that the DRPs 61 to 68 are not located on only a single substrate, the second change unit 32c causes the identification number assignment unit 32a to execute a third assignment process described later. It should be noted that FIG. 5 shows a case where the first assignment process is executed. The second and third assignment processes are described later.

In FIG. 5, the DRP 61 of a first stage realizes a JPEG expansion process unit by the control of the CPU 32. The DRP 62 of a second stage realizes a color conversion process unit. The DRP 63 of a third stage realizes an enlargement process unit. The DRP 64 of a fourth stage realizes a screen process unit. Although the DRPs 65 to 67 are omitted, the DRP 65 of a fifth stage realizes a JPEG expansion process unit. The DRP 66 of a sixth stage realizes a color conversion process unit. The DRP 67 of a seventh stage realizes an enlargement process unit. The DRP 68 of an eighth stage as the final stage realizes a screen process unit.

When the image information based on the print job is input to the DRP 61 for example, a JPEG expansion process is executed to the image information. When the JPEG expansion process to the image information is completed, the DRP 62 next executes a color conversion process to the image information. When the color conversion process to the image information is completed, the DRP 63 next executes the enlargement process to the image information. When the enlargement process to the image information is completed, the DRP 64 next executes the screen process to the image information. When the screen process to the image information is completed, the image information is sequentially input to the DRPs 65 to 68. The image processes which the DRPs 65 to 68 realize are executed to the image information with the DRPs 61 to 64, and hence the image processes are not executed. Therefore, when the DRP 68 is connected to the print data outputting unit 13, the image information as print data is output from the print data outputting unit 13.

On the other hand, the identification number assignment unit 32a calculates a maximum number based on the total number of DRPs 61 to 68, and assigns the maximum number to the DRP 68 of the final stage. For example, since the number of DRPs 61 to 68 is eight in FIG. 5, the identification number assignment unit 32a assigns the identification number "7" as the maximum number in the identification numbers "0" to "7", to the DRP 68.

The DRP 68 transmits a numerical value "6" acquired by decreasing or subtracting one from the maximum number "7", to the DRP 67. The identification number "6" is set to the DRP 67. The DRP 67 transmits a numerical value "5" acquired by decreasing or subtracting one from the maximum number "6", to the DRP 66. The identification number "5" is set to the DRP 66. Thus, numerical values acquired by sequentially decreasing or subtracting one by one from the maximum number are assigned as the identification numbers to the DRPs 61 to 67 except for the DRP 68 of the final stage, respectively. That is, the assignment is executed along a direction opposed to a transmission direction of the image information. Hereby, the identification number "1" is assigned to the DRP 62, and the identification number "0" is assigned to the DRP 61.

The storage device 33 realizes an image information storage unit 33x. The image information storage unit 33x is realized by the above-mentioned ROM 33b or HDD 33e. The image information storage unit 33x stores the image information. The image information is called up from the CPU 32, and transmitted to the DRP 61.

Next, a description will now be given, with reference to FIGS. 6 to 13, of the operation of the image processing apparatus 12 according to the exemplary embodiment.

Figure 6:
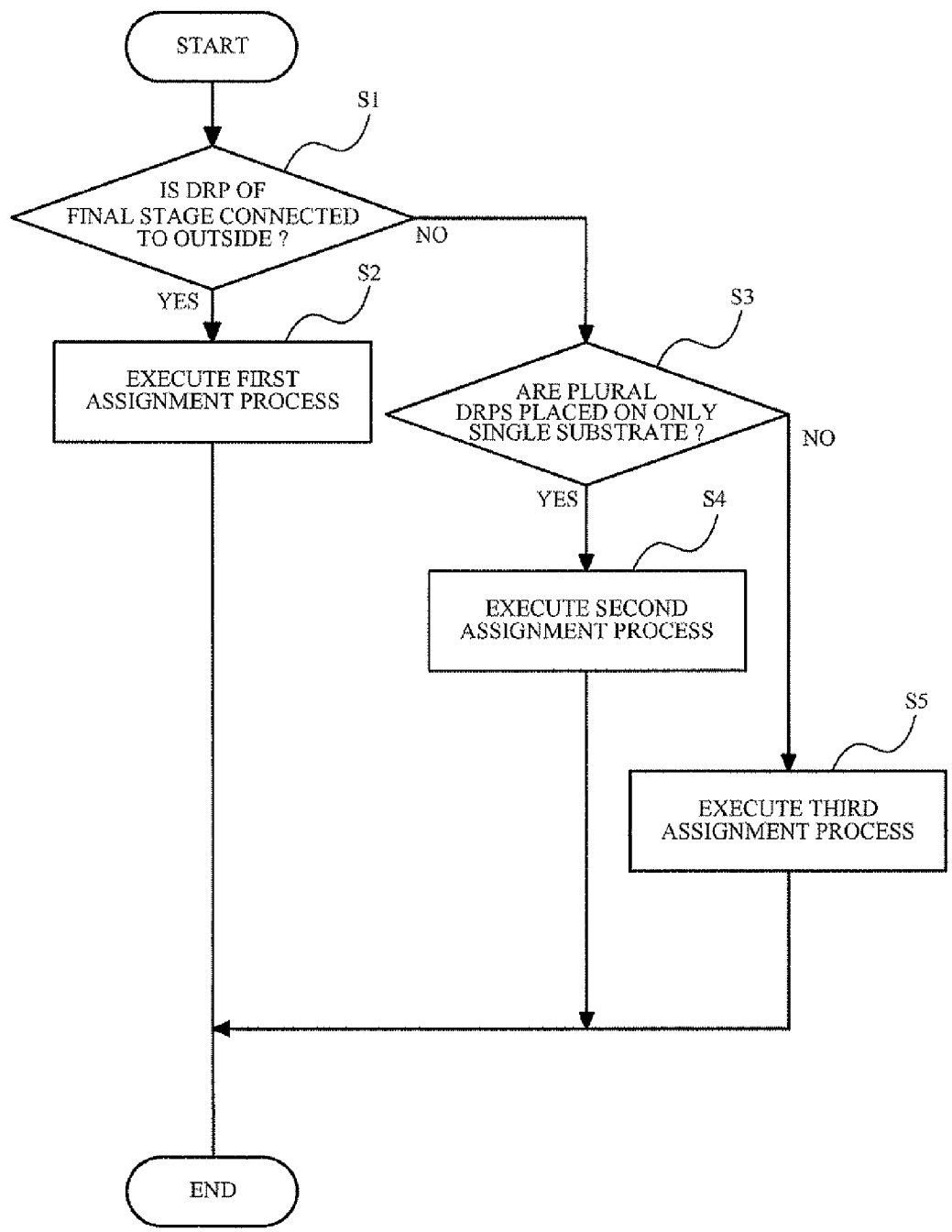
FIG. 6 is a flowchart showing an example of the operation of the image processing apparatus.

FIG. 6 is a flowchart showing an example of the operation of the image processing apparatus 12. As shown in FIG. 6, when a power of the image processing apparatus 12 is turned on, the first change unit 32b judges whether the DRP 68 of the final stage is connected to the outside of the image processing apparatus 12 (step S1). Here, it is assumed that the DRP 68 of the final stage is connected to the print data outputting unit 13 by the wiring. When the power of the image processing apparatus 12 is turned on, connection information indicating the final stage is set to a storage unit of the DRP 68 of the final stage, and then the connection information is notified to the first change unit 32b. The first change unit 32b judges whether the DRP 68 of the final stage is connected to the outside of the image processing apparatus 12, by confirming the connection information.

When the first change unit 32b judges that the DRP 68 of the final stage is connected to the outside of the image processing apparatus 12 (YES in step S1), the identification number assignment unit 32a executes the first assignment process (step S2). On the other hand, when the first change unit 32b judges that the DRP 68 of the final stage is not connected to the outside of the image processing apparatus 12 (NO in step S1), the second change unit 32c judges whether the DRPs 61 to 68 are placed on only the single substrate (step S3). Specifically, the second change unit 32c first recognizes and calculates the number of DRPs placed on each substrate. Next, the second change unit 32c confirms how many substrates the second change unit 32c itself is connected to through a connection terminal of each substrate.

When the second change unit 32c judges that the DRPs 61 to 68 are placed on only the single substrate (YES in step S3), the second change unit 32c causes the identification number assignment unit 32a to execute the second assignment process (step S4). On the other hand, when the second change unit 32c judges that the DRPs 61 to 68 are not placed on only the single substrate (NO in step S3), the second change unit 32c causes the identification number assignment unit 32a to execute the third assignment process (step S5). That is, when the DRPs 61 to 68 are placed across two or more substrates through a connection terminal of each substrate, the third assignment process is executed.

Figure 7:
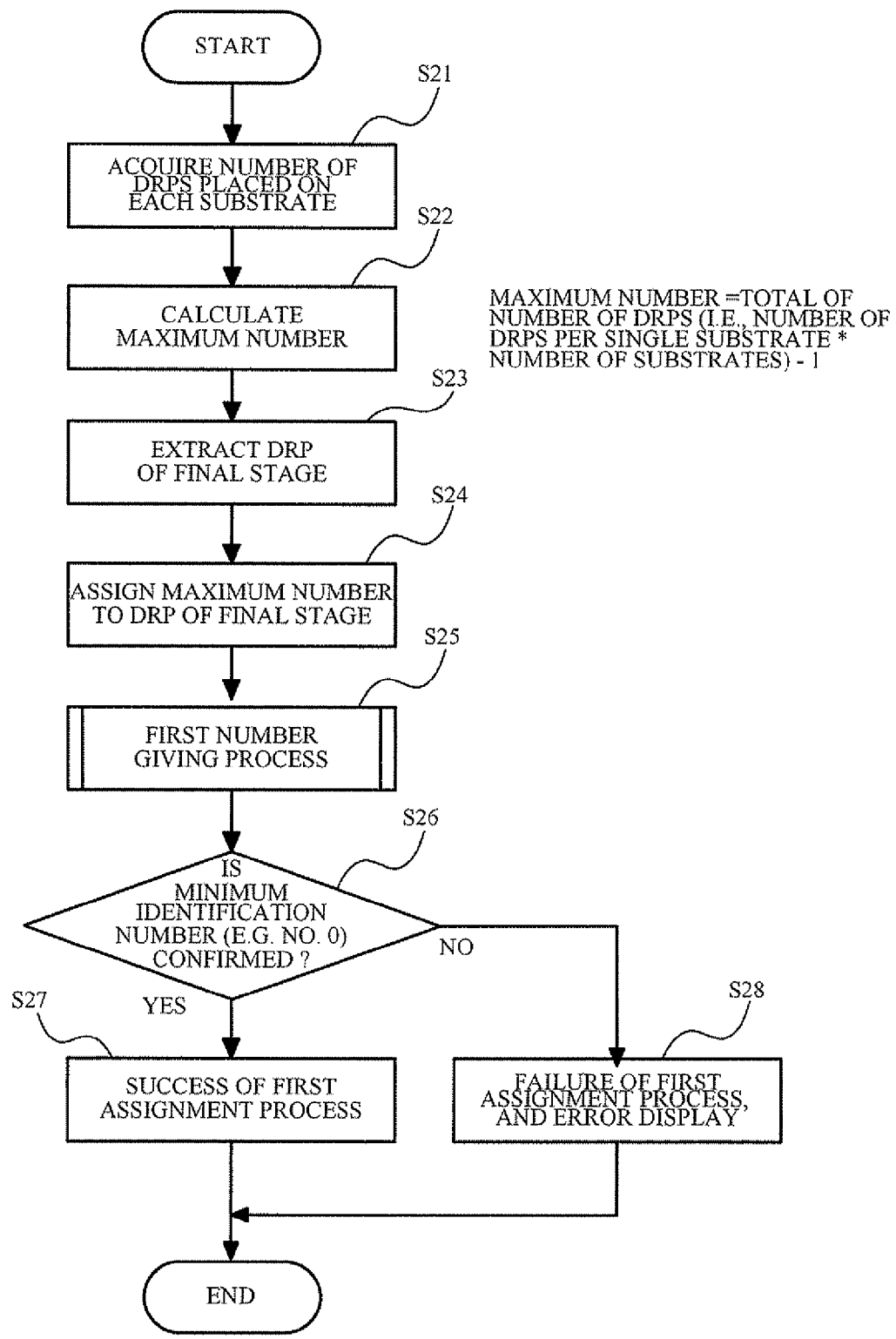
FIG. 7 is a flowchart showing an example of a first assignment process.

FIG. 7 is a flowchart showing an example of the first assignment process. The identification number assignment unit 32a first acquires the number of DRPs 61 to 68 placed on each substrate (step S21), and calculates the maximum number (step S22). For example, when four DRPs are placed on each of two substrates, the total of the number of DRPs is eight. Therefore, when a minimum number is assigned as "0", the maximum number is "7".

Next, the identification number assignment unit 32a extracts the DRP 68 of the final stage (step S23), and assigns the maximum number to the DRP 68 of the final stage (step S24). The connection information indicating the final stage is stored into the storage unit in the DRP 68 of the final stage, and then is notified to the identification number assignment unit 32a by the first change unit 32b. The identification number assignment unit 32a assigns the identification number "7" to the DRP 68 in which the connection information is confirmed.

The identification number assignment unit 32a executes a first number giving process (step S25). Specifically, when the maximum number is assigned, the DRP 68 starts a process that assigns the identification number to the DRP 67 other than the DRP 68 itself of the final stage. That is, the DRP 68 transmits the numerical value "6" acquired by decreasing or subtracting one from the identification number "7" assigned to the DRP 68 itself, to the DRP 67. The storage unit of the DRP 67 stores the received identification number "6". The DRPs 62 to 67 execute the same transmission process as the transmission process of the DRP 68. Hereby, the identification numbers "0" to "7" are stored into the DRPs 61 to 68. It should be noted that the above-mentioned first number giving process will be described later, with reference to FIG. 9.

The identification number assignment unit 32a judges whether the identification number assignment unit 32a itself has confirmed the minimum identification number (step S26). When the identification number assignment unit 32a judges that the identification number assignment unit 32a itself has confirmed the minimum identification number, the identification number assignment unit 32a judges that the first assignment process is success (step S27). When the identification number assignment unit 32a judges that the identification number assignment unit 32a itself has not confirmed the minimum identification number, the identification number assignment unit 32a judges that the first assignment process is failure (step S28). In this case, an error is displayed on a display unit formed in the image forming apparatus 1 or a display of the outputting device 20. For example, the error includes a wiring error.

Figure 8:
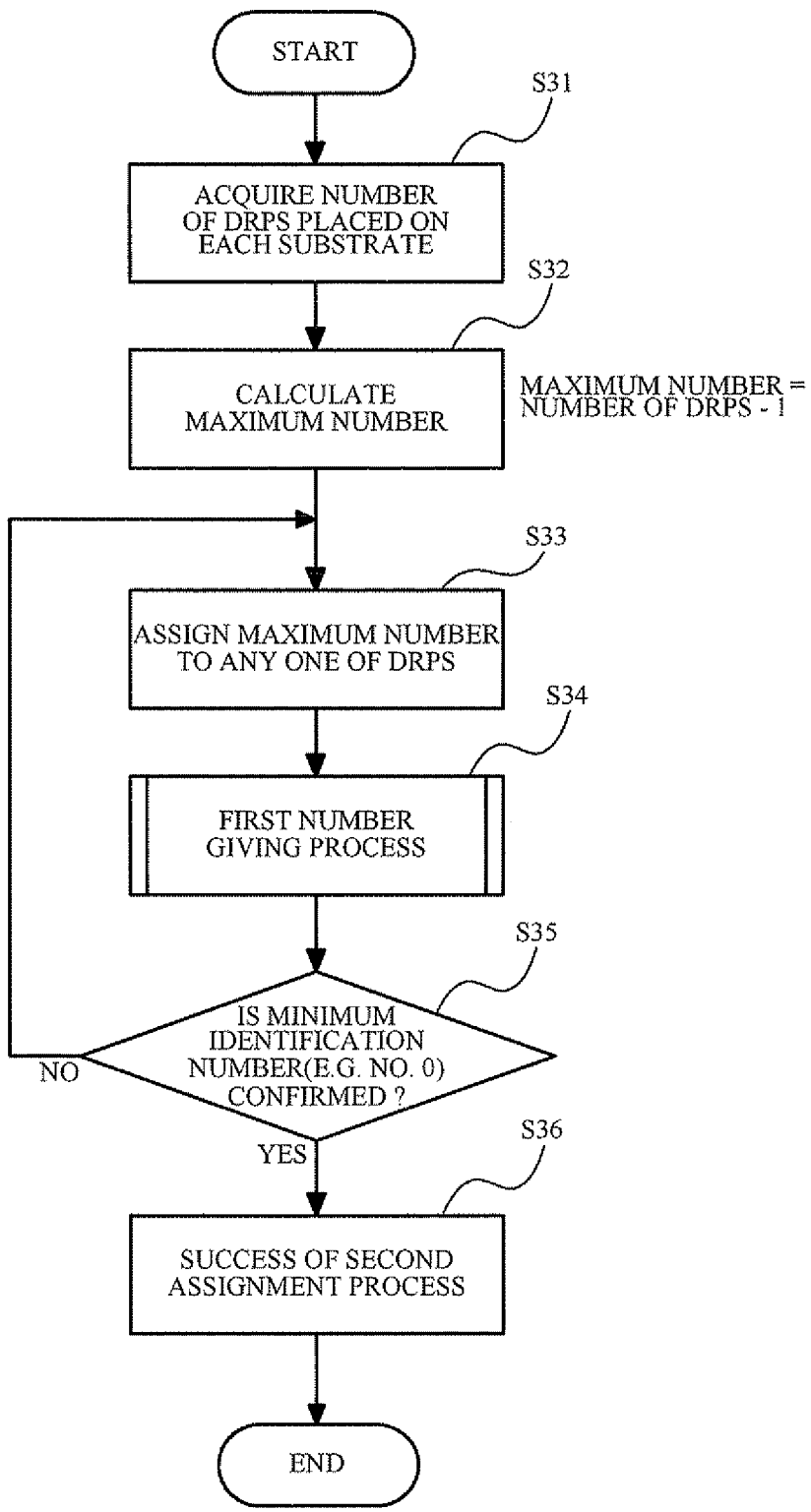
FIG. 8 is a flowchart showing an example of a second assignment process.

FIG. 8 is a flowchart showing an example of the second assignment process. The identification number assignment unit 32a first acquires the number of DRPs 61 to 64 placed on each substrate (step S31), and calculates the maximum number (step S32). For example, when four DRPs are placed on a single substrates, the number of DRPs is four. Therefore, when the minimum number is assigned as "0", the maximum number is "3".

Next, the identification number assignment unit 32a assigns the maximum number to any one of the DRPs 61 to 64 (step S33). For example, the identification number assignment unit 32a assigns the identification number "3" to the DRP 62.

The identification number assignment unit 32a executes the first number giving process (step S34). Specifically, when the maximum number is assigned, the DRP 62 starts a process that assigns the identification number to the DRP 61 other than the DRP 62. That is, the DRP 62 transmits the numerical value "2" acquired by decreasing or subtracting one from the identification number "3" assigned to the DRP 62 itself, to the DRP 61. The storage unit of the DRP 61 stores the received identification number "2". The DRP 61 executes the same transmission process as the transmission process of the DRP 62.

The identification number assignment unit 32a judges whether the identification number assignment unit 32a itself has confirmed the minimum identification number (step S35). When the identification number assignment unit 32a judges that the identification number assignment unit 32a itself has confirmed the minimum identification number (YES in step S35), the identification number assignment unit 32a judges that the second assignment process is success (step S36). When the identification number assignment unit 32a judges that the identification number assignment unit 32a itself has not confirmed the minimum identification number (No in step S35), the identification number assignment unit 32a repeats the processes of steps S33 to S35. In this case, the identification number assignment unit 32a assigns the maximum identification number "3" to any one of the DRPs 61, 63, and 64 other than the DRP 62 to which the maximum number is assigned, again. The identification number assignment unit 32a guides the second assignment process to success by repeating these processes of steps S33 to S35.

Figure 9:
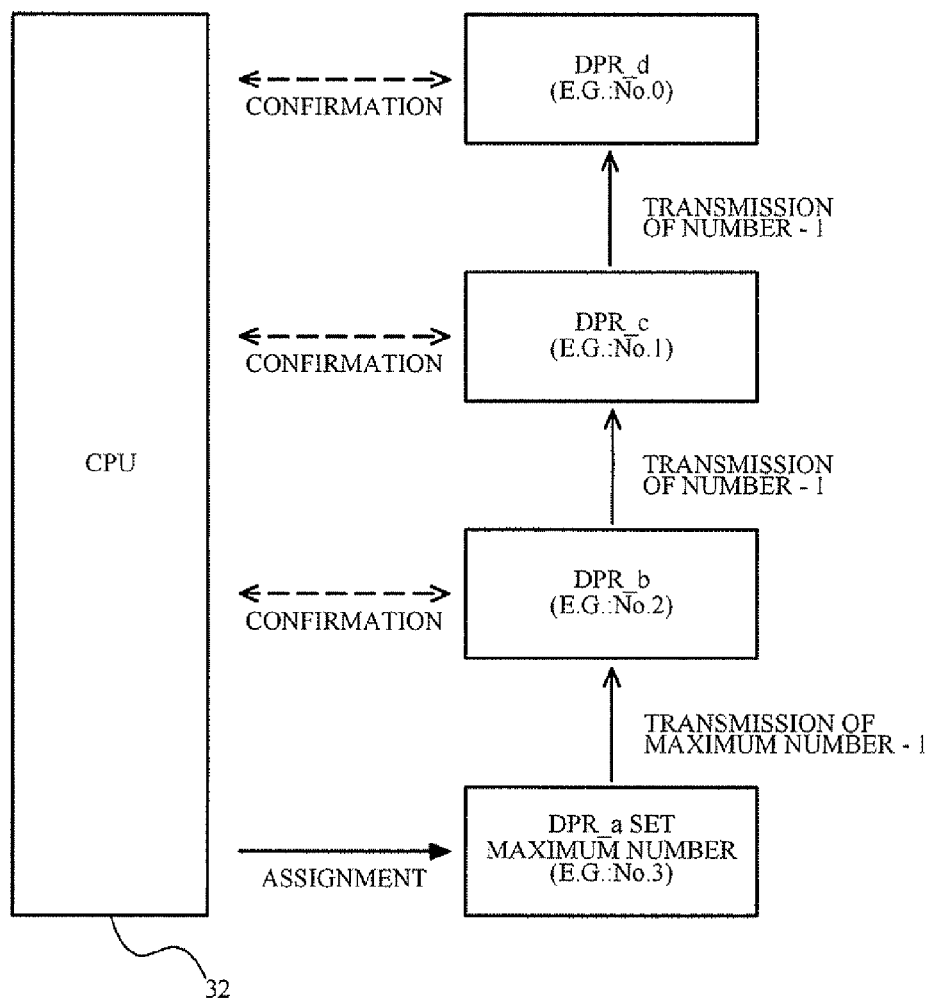
FIG. 9 is a schematic diagram showing an example of a first number giving process.

FIG. 9 is a schematic diagram showing an example of the first number giving process. Although the process of step S34 is shown in FIG. 9, the same method is also applied to the process of step S25.

The CPU 32 which realizes the identification number assignment unit 32a calculates the maximum identification number "3" from the number of DRPs, and assigns the maximum identification number "3" to a DRP_a. The DRP_a transmits the numerical value "2" acquired by decreasing or subtracting one from the maximum identification number "3", to a DRP_b. The DRP_b stores the numerical value "2" as the identification number. The DRP_b transmits the numerical value "1" acquired by decreasing or subtracting one from the maximum identification number "2", to a DRP_c. The DRP_c stores the numerical value "1" as the identification number. The DRP_c transmits the numerical value "0" acquired by decreasing or subtracting one from the maximum identification number "1", to a DRP_d. The DRP_d stores the numerical value "0" as the identification number. Thus, the identification numbers are assigned to the DRP_a to the DRP_d, respectively. Hereby, the CPU 32 identifies the DRP_a to the DRP_d by confirming the identification numbers.

Figure 10:
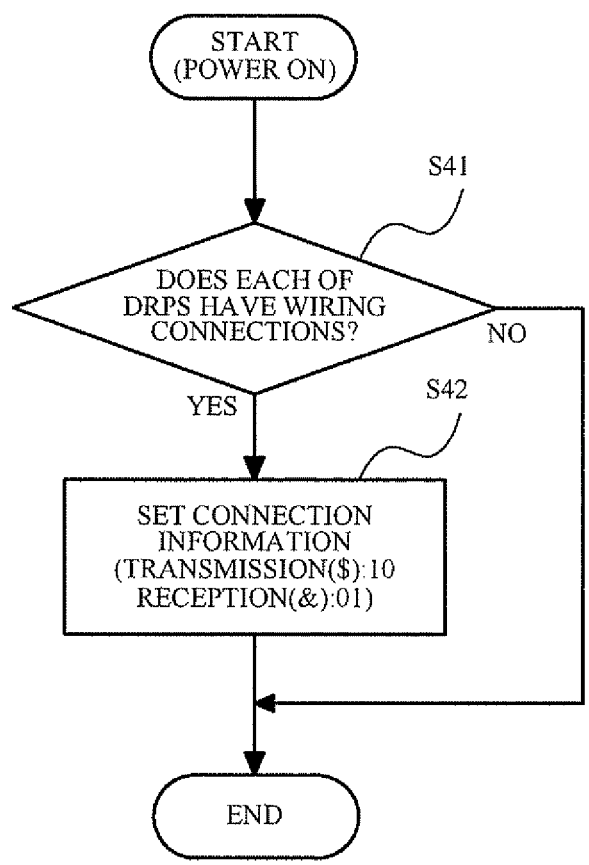
FIG. 10 is a flowchart showing an example of a connection information setting process.

FIG. 10 is a flowchart showing an example of a connection information setting process. The connection information setting process is a process for setting the connection information used for the third assignment process described later. The connection information setting process is executed with the DRPs 61 to 68. It is preferable that the connection information setting process is completed before the process of step S1 shown in FIG. 6 described above.

Figure 16:
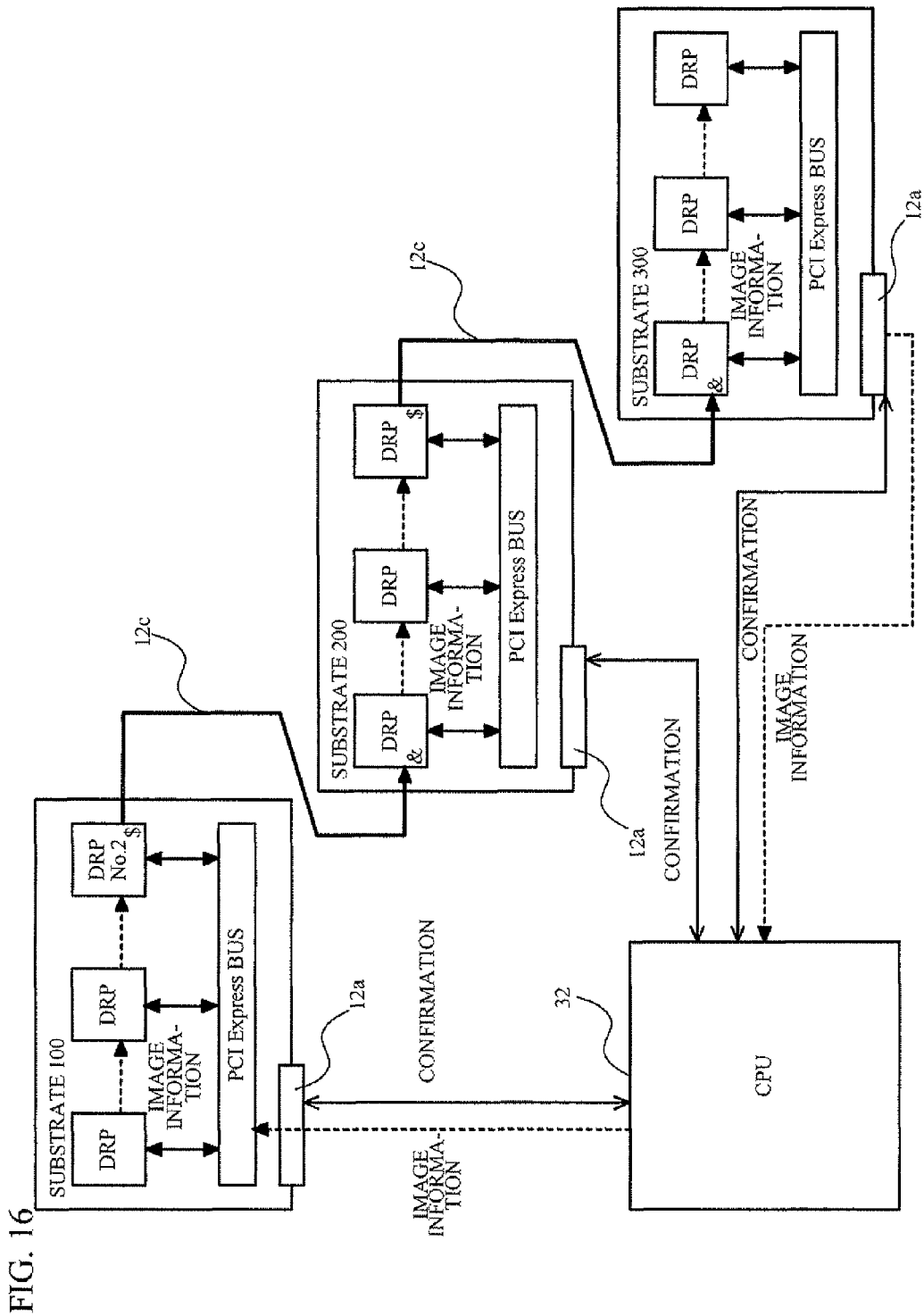
FIG. 16 is an explanatory diagram showing an example of the third assignment process.
Figure 17:
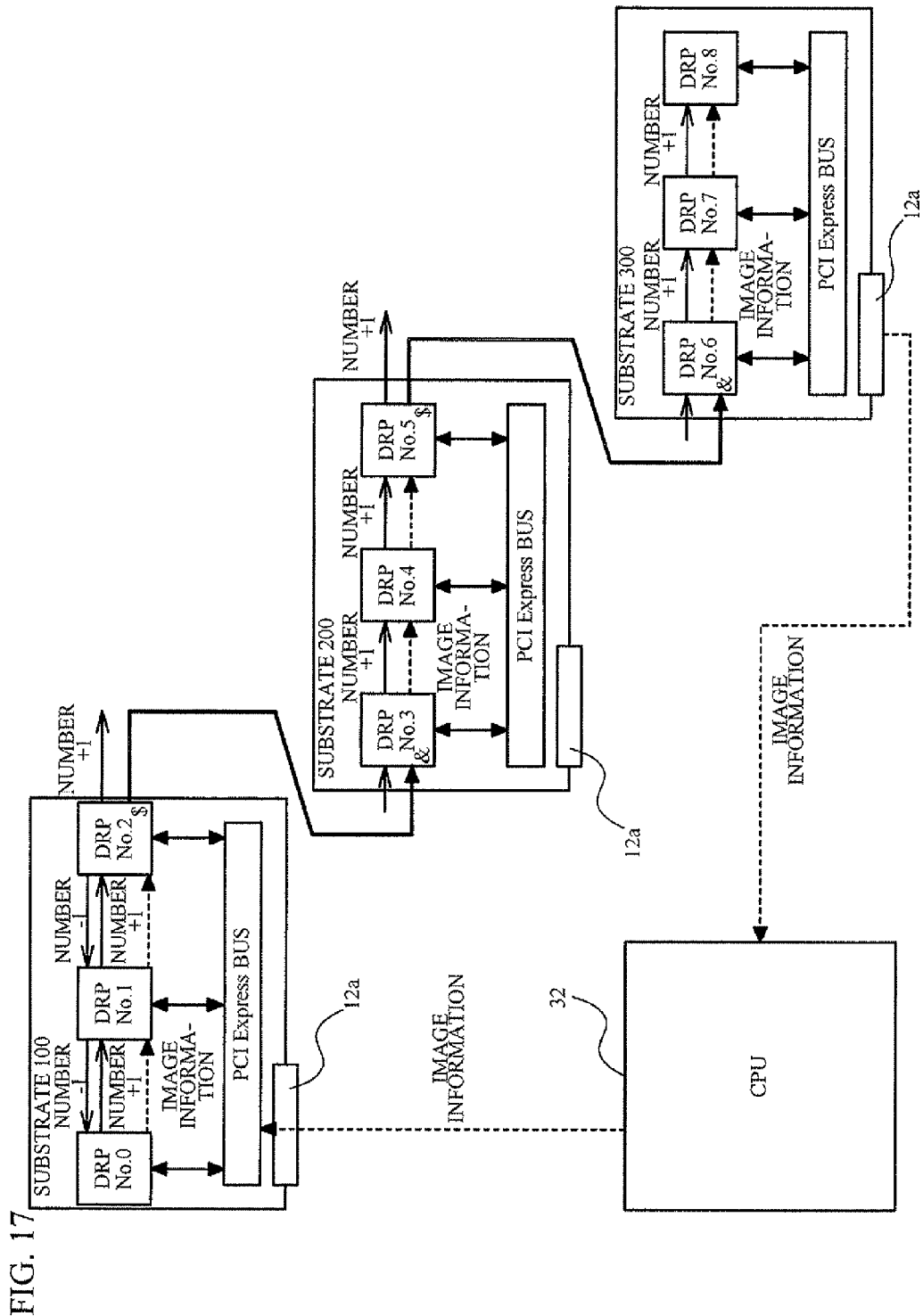
FIG. 17 is an explanatory diagram showing an example of the third assignment process.

When the power of the image processing apparatus 12 is turned on, each of the DRPs 61 to 68 judges whether each of the DRPs 61 to 68 has wiring connections for connecting each DRP itself to other DRPs (step S41). The wiring includes a cable or a cord, for example. When each of the DRPs 61 to 68 judges that each of the DRPs 61 to 68 itself has wiring connections (YES in step S41), each of the DRPs 61 to 68 sets the connection information to itself (step S42). Specifically, each of the DRPs 61 to 68 is connected to a transmission side of the wiring, and electrically connected to other DRPs with a terminal of a two-bits width, an input signal level of each of the DRPs 61 to 68 becomes "H (high)". Each of the DRPs 61 to 68 is connected to a transmission side of the wiring, and is not electrically connected to other DRPs with the terminal of the two-bits width, the input signal level of each of the DRPs 61 to 68 becomes "L (low)". When the input signal level of first bits is "H (01)", each of the DRPs 61 to 68 sets the connection information indicative of reception to itself. When the input signal level of second bits is "H (10)", each of the DRPs 61 to 68 sets the connection information indicative of transmission to itself. When the input signal levels of the first bits and the second bits are "L (00)", each of the DRPs 61 to 68 sets information indicative of no wiring connection to itself. In FIGS. 16 and 17 described later, the connection information indicative of transmission is shown as a mark "$", and the connection information indicative of reception is shown as a mark "&".

On the other hand, when each of the DRPs 61 to 68 judges that each of the DRPs 61 to 68 itself has no wiring connection (NO in step S41), each of the DRPs 61 to 68 completes the connection information setting process. In this case, each of the DRPs 61 to 68 is not connected to both of reception and transmission sides of the wiring. Therefore, the connection information "00" set at the time of turning on of power is maintained.

Figure 11:
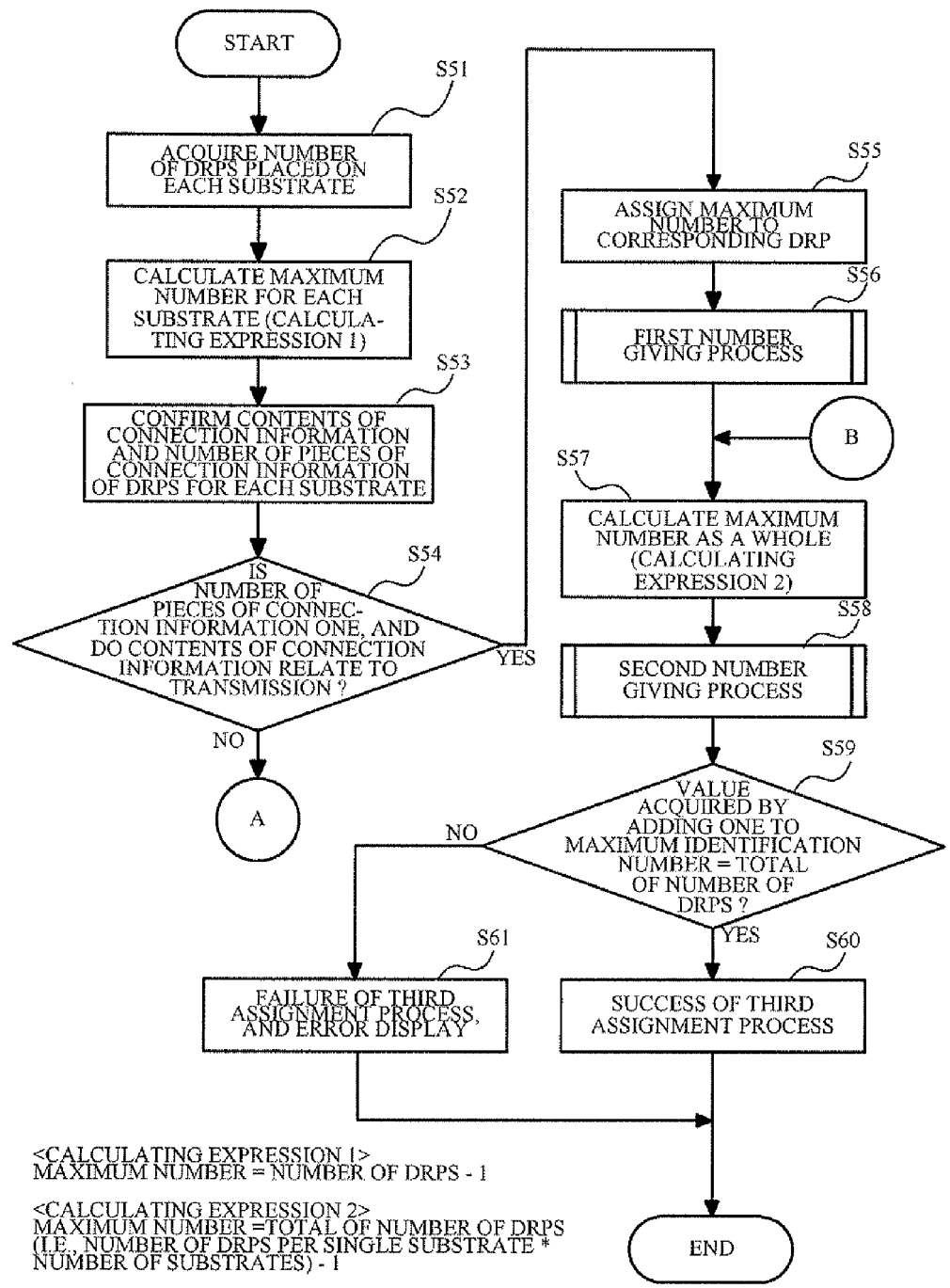
FIG. 11 is a flowchart showing an example of a third assignment process.
Figure 12:
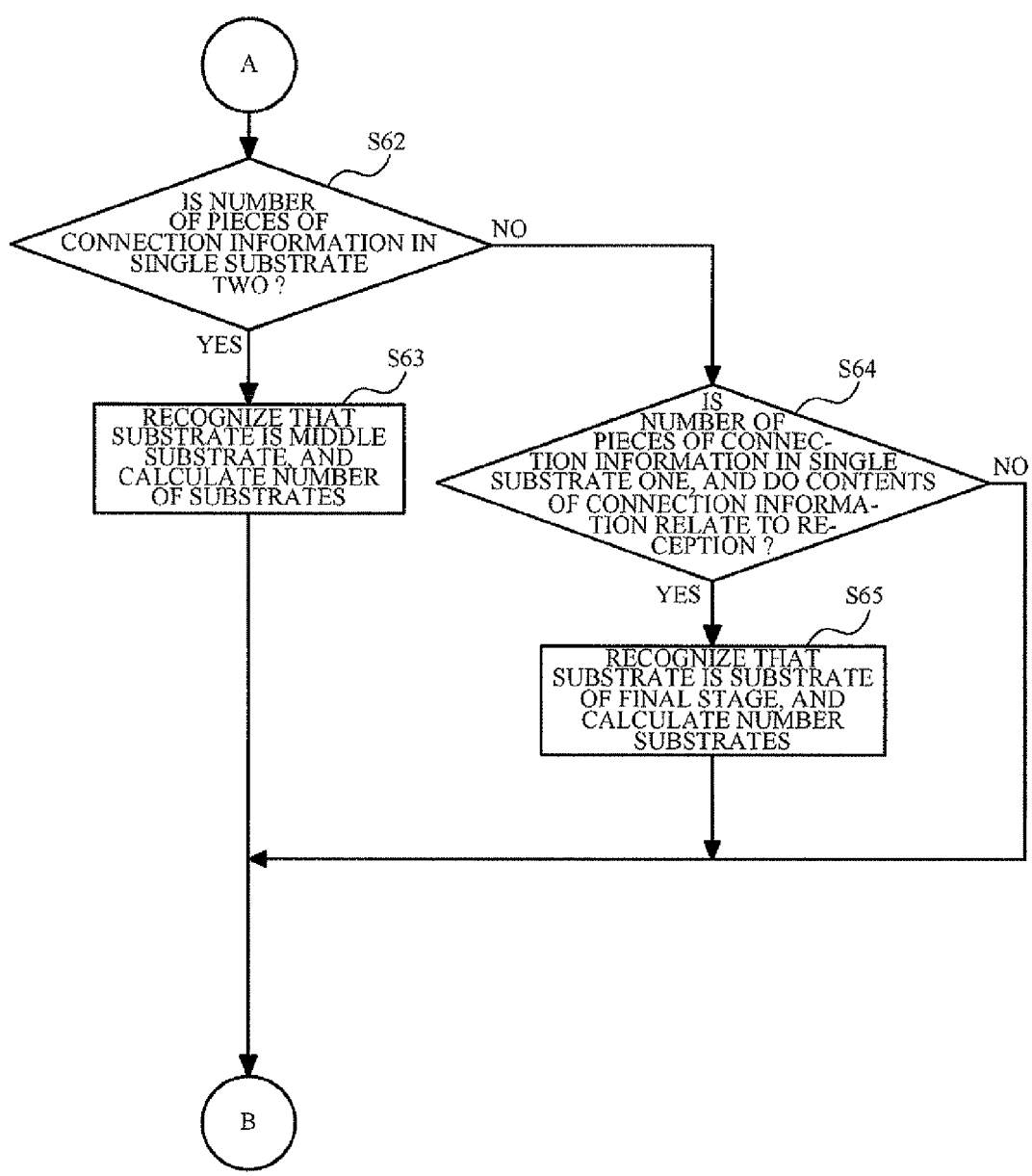
FIG. 12 is a flowchart showing an example of the third assignment process.

FIGS. 11 and 12 are flowcharts showing an example of the third assignment process. As shown in FIG. 11, the identification number assignment unit 32*a* first acquires the number of DRPs 61 to 68 placed on each substrate (step S51), and calculates the maximum number for each substrate (step S52). For example, when three DRPs are placed on each of three substrates, the maximum number of DRPs is three. Therefore, when the minimum number is assigned as "0", the maximum number is "2" based on a "calculating expression 1" shown in FIG. 11.

Next, the identification number assignment unit 32*a* confirms the contents of the connection information and the number of pieces of connection information of the DRPs 61 to 68 for each substrate (step S53). The identification number assignment unit 32*a* judges whether a substrate in which the number of pieces of connection information in the single substrate is one and the contents of the connection information relate to the transmission exists (step S54).

When the identification number assignment unit 32*a* judges that the substrate in which the number of pieces of connection information in the single substrate is one and the contents of the connection information relate to the transmission exists (YES in step S54), the identification number assignment unit 32*a* assigns the maximum number to the DRP 63 placed on the substrate (step S55), and executes the above-mentioned first number giving process (step S56). Hereby, the identification number "1" is set to the DRP 62, and the minimum identification number "0" is set to the DRP 61.

When the identification number assignment unit 32*a* completes giving the identification numbers to the DRPs 61 to 63, the identification number assignment unit 32*a* calculates the maximum number as a whole (step S57), and executes a second number giving process (step S58). For example, when three DRPs are placed on each of three substrates, the maximum number of DRPs is nine. Therefore, when the minimum number is assigned as "0", the maximum number is "8" based on a "calculating expression 2" shown in FIG. 11. The second number giving process will be described later, with reference to FIG. 13.

Next, the identification number assignment unit 32*a* judges whether a value acquired by adding one to the maximum identification number is the total of the number of DRPs (step S59). In the present exemplary embodiment, since the maximum number is "8", a value "9" is acquired when one is added to the maximum number "8". This value "9" is identical with the total of the number of DRPs.

When the identification number assignment unit 32*a* judges that the value acquired by adding one to the maximum identification number is the total of the number of DRPs (YES in step S59), the identification number assignment unit 32*a* judges that the third assignment process is success (step S60). When the identification number assignment unit 32*a* judges that the value acquired by adding one to the maximum identification number is not the total of the number of DRPs (NO in step S59), the identification number assignment unit 32*a* judges that the third assignment process is failure (step S61). In this case, as described in the first assignment process, the wiring error is displayed on the display unit formed in the image forming apparatus 1 or the display of the outputting device 20.

On the other hand, when the identification number assignment unit 32*a* judges that the substrate in which the number of pieces of connection information in the single substrate is one and the contents of the connection information relate to the transmission does not exist (NO in step S54), the identification number assignment unit 32*a* judges whether a substrate in which the number of pieces of connection information in the single substrate is two exists, as shown in FIG. 12 (step S62).

When the identification number assignment unit 32*a* judges that the substrate in which the number of pieces of connection information in the single substrate is two exists (YES in step S62), the identification number assignment unit 32*a* recognizes that the substrate is a middle substrate, and calculates the number of substrates (step S63). The results of the calculation is the basis for the calculation process in the step S57. The middle substrate is a substrate other than the substrate in which the number of pieces of connection information in the single substrate is one and the contents of the connection information relate to the transmission, and the substrate in which the number of pieces of connection information in the single substrate is one and the contents of the connection information relate to the reception.

When the identification number assignment unit 32*a* judges that the substrate in which the number of pieces of connection information in the single substrate is two does not exist (NO in step S62), the identification number assignment unit 32*a* further judges whether the substrate in which the number of pieces of connection information in the single substrate is one and the contents of the connection information relate to the reception exists (step S64).

When the identification number assignment unit 32*a* judges that the substrate in which the number of pieces of connection information in the single substrate is one and the contents of the connection information relate to the reception exists (YES in step S64), the identification number assignment unit 32*a* recognizes that the substrate is a substrate of the final stage, and calculates the number of substrates (step S65). The results of the calculation is the basis for the calculation process in the above-mentioned step S57.

When the identification number assignment unit 32*a* judges that the substrate in which the number of pieces of connection information in the single substrate is one and the contents of the connection information relate to the reception does not exist (NO in step S64), the procedure transfers to step S57. That is, the substrate placed on the DRP to which the connection information is not set at all is not wired with another substrate, and is not the basis for the calculation process in the step S57. Such a substrate has already been an object of the second assignment process.

Figure 13:
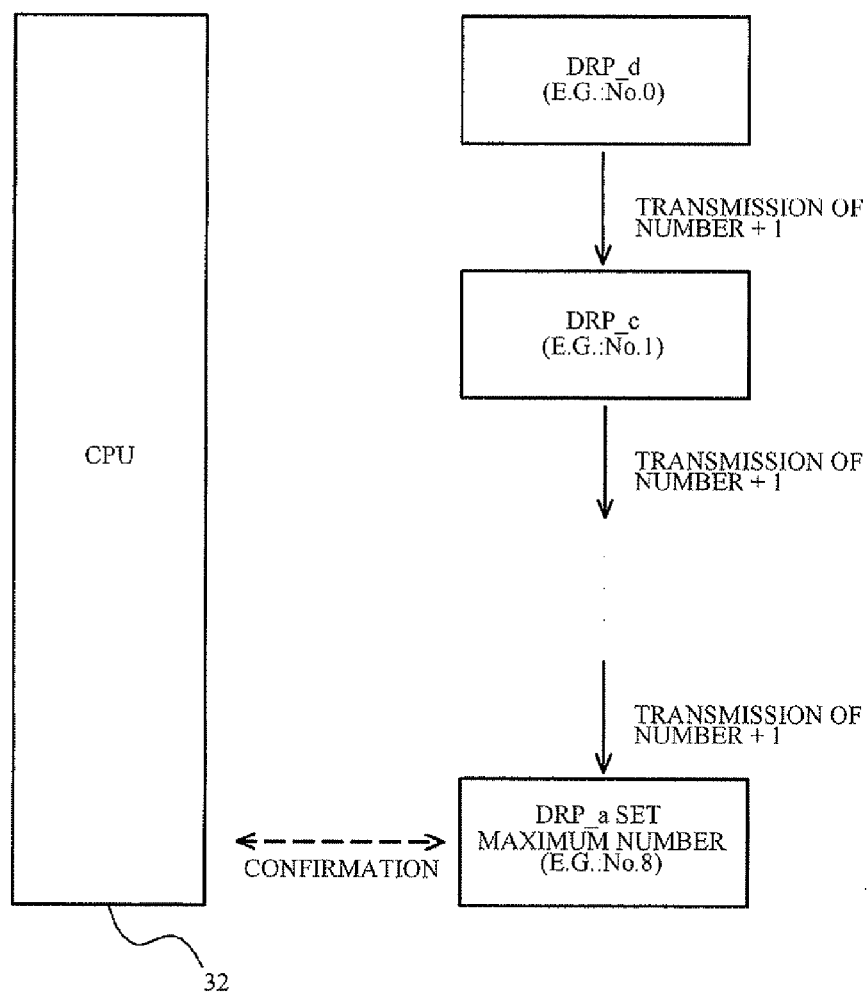
FIG. 13 is a schematic diagram showing an example of a second number giving process.

FIG. 13 is a schematic diagram showing an example of the second number giving process. When the DRP_d stores a value "0" as the identification number, the DRP_d transmits a value "1" acquired by adding one to the identification number "0", to the DRP_c. The DRP_c stores the value "1" as the identification number. Since the identification number "1" is already stored into the DRP_c by the first number giving process, the storage process may not be executed. In this case, the same identification number "1" may be rewritten.

When the DRP_c stores the value "1" as the identification number, the DRP_c transmits a value "2" acquired by adding one to the identification number "1", to the DRP_b. The DRP_b stores the value "2" as the identification number. Since the identification number "2" is already stored into the DRP_b, the storage process may not be executed. In this case, the same identification number "2" may be rewritten.

Thus, the value acquired by adding one to the identification number is stored into the DRP. Hereby, when the total of the number of DRPs is nine, the DRP_a shown in FIG. 13 stores the value "8" as the identification number. The CPU 32 judges that the second number giving process is success, based on a fact that the value acquired by adding one to the identification number "8" stored into the DRP_a is identical with the total of the number of DRPs.

The second number giving process is executed along the same direction as the transmission direction of the image information. Therefore, a transmission path of the image information is used as a transmission path of the identification number. Hereby, a new wiring circuit need not be provided. Thus, the identification numbers are assigned to the DRP_a to the DRP_d. The CPU 32 identifies the DRP_a to the DRP_d by confirming the identification numbers.

Next, a description will now be given of the concepts of the first to third assignment processes described above, with reference to FIGS. 14 to 18.

Figure 14:
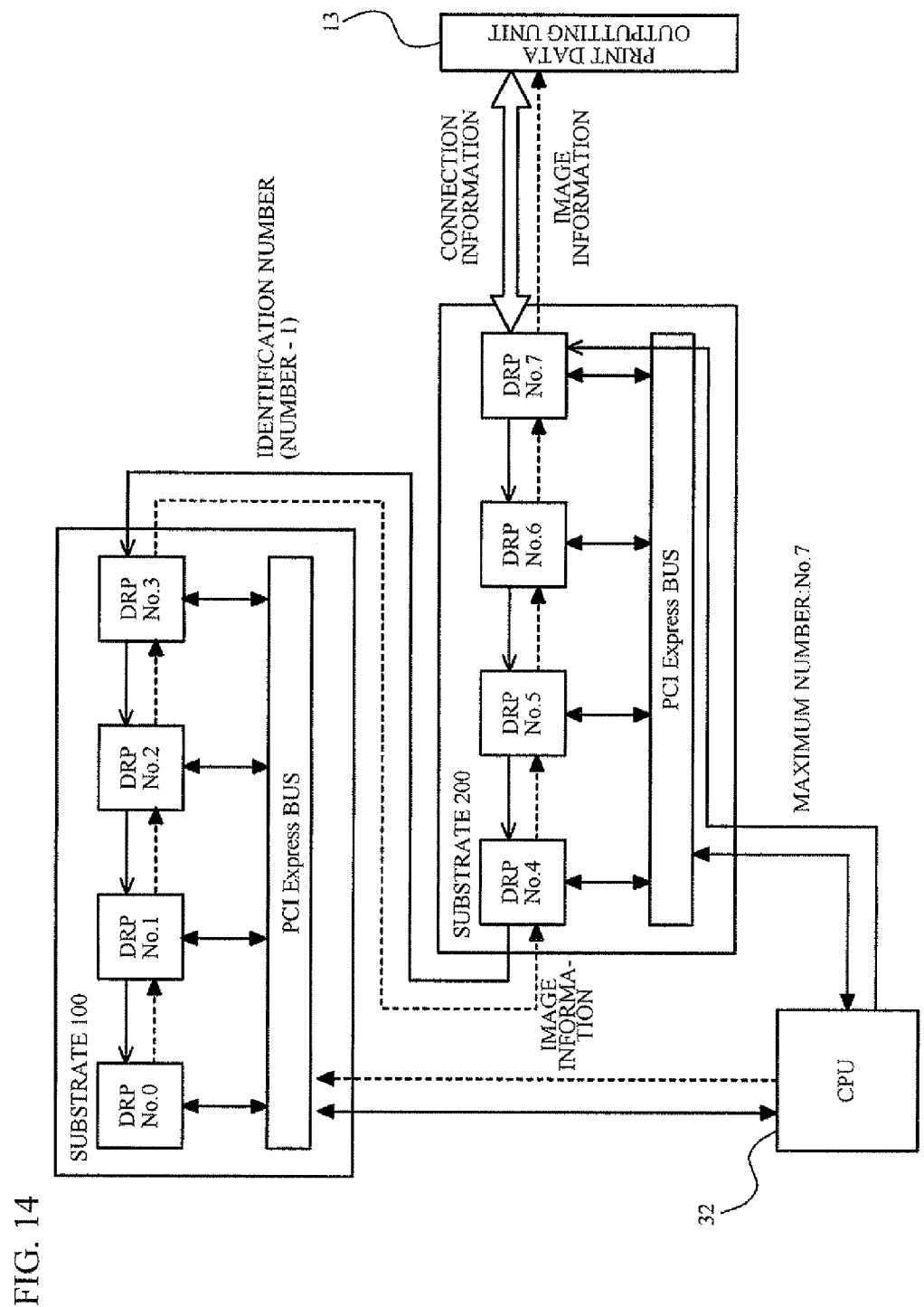
FIG. 14 is an explanatory diagram showing an example of the first assignment process.

FIG. 14 is an explanatory diagram showing an example of the first assignment process. FIG. 14 corresponds to the above-mentioned flowchart shown in FIG. 7. In FIG. 14, four DRPs are located on each of two substrate, i.e., a substrate 100 and a substrate 200. The DRP provided at the right end of the substrate 200 is connected to the print data outputting unit 13. The DRP provided at the right end of the substrate 100 is connected to the DRP provided at the left end of the substrate 200. The connection is executed by the wiring such as a cable and a cord. When the DRP of the final stage is connected to the print data outputting unit 13, the number of substrates may be three or more. In FIG. 14, an arrow of a broken line coupling between the DRPs shows the transmission direction of the image information. An arrow of a solid line coupling between the DRPs shows the transmission direction of the identification number.

When the power of the image processing apparatus 12 is turned on, each DRP of the substrates 100 and 200 confirms whether the DRP itself is connected to the print data outputting unit 13. In FIG. 14, the DRP provided at the right end of the substrate 200 confirms that the DRP itself is connected to the print data outputting unit 13. For example, when the DRP of the final stage is connected to a ground, and a specific input signal is input to each DRP, the input signal level of the DRP of the final stage becomes "L" and the input signal levels of the other DRPs become "H". Hereby, each DRP recognizes whether the DRP itself is the DRP of the final stage based on the input signal level. Then, the DRP of the input signal level "L" decides that the DRP itself is the DRP of the final stage, notifies the CPU 32 of information showing the DRP of the final stage, and stores the information showing the DRP of the final stage into the storage unit in the DRP of the input signal level "L".

The CPU 32 calculates the maximum number based on the total of the number of DRPs, and then extracts the DRP storing the information showing the DRP of the final stage, based on the notification from the DRP of the final stage. In FIG. 14, the CPU 32 recognizes that the DRP provided at the right end of the substrate 200 is the DRP of the final stage. Therefore, the CPU 32 calculates the maximum identification number "7" based on the total "8" of the number of DRPs, and assigns the maximum identification number "7" to the DRP provided at the right end of the substrate 200. In FIG. 14, "No. 7" is shown in the DRP provided at the right end of the substrate 200.

The DRP to which the identification number "7" is assigned transmits a value "6" acquired by decreasing or subtracting one from the identification number "7", to the DRP provided in the immediate left of the "No. 7" DRP, as shown by the arrow of the solid line. Hereby, the identification number "6" is assigned to the DRP provided in the immediate left of the "No. 7" DRP. In the FIG. 14, "No. 6" is shown in the DRP placed in the immediate left of the "No. 7" DRP. Similarly, each DPR of the substrate 200 sequentially executes the assignment process. Hereby, the identification numbers "5" and "4" are assigned to the remaining DRPs of the substrate 200.

Next, the DRP to which the identification number "4" is assigned transmits a value "3" acquired by decreasing or subtracting one from the identification number "4", to the DRP provided at the right end of the substrate 100, as shown by the arrow of the solid line. Hereby, the identification number "3" is assigned to the DRP. In FIG. 14, "No. 3" is shown in the DRP. Similarly, each DPR of the substrate 100 sequentially executes the assignment process. Hereby, the identification numbers "2", "1", and "0" are assigned to the remaining DRPs of the substrate 100.

When the identification number is assigned to each DRP, the CPU 32 outputs the image information to the DRP of the identification number "0". The DRP of the identification number "0" executes the image process decided by the CPU 32 to the input image information, and transmits the image information after the execution of the image process to the DRP provided in the immediate right thereof, as shown by the arrow of the broken line. The DRP of the identification number "1" executes the image process decided by the CPU 32 to the input image information, and transmits the image information after the execution of the image process to the DRP provided in the immediate right thereof, as shown by an arrow of the broken line. Such processes are sequentially executed, so that the image processes based on the print job are completed. The image information to which the image processes are executed is output to the print data outputting unit 13.

Figure 15:
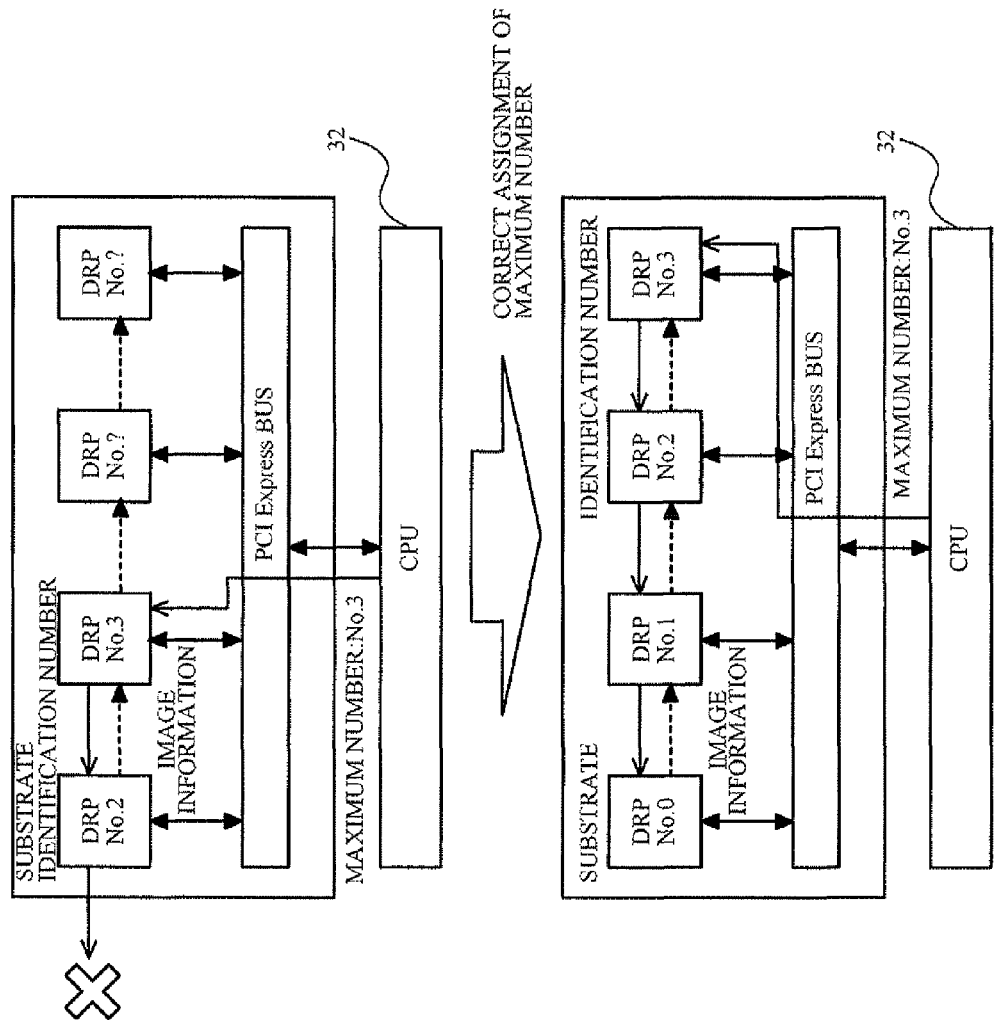
FIG. 15 is an explanatory diagram showing an example of the second assignment process.

FIG. 15 is an explanatory diagram showing an example of the second assignment process. FIG. 15 corresponds to the above-mentioned flowchart shown in FIG. 8. In FIG. 15, four DRPs are located on the single substrate. Each DRP is not connected to the print data outputting unit 13. In FIG. 15, an arrow of a broken line coupling between the DRPs shows the transmission direction of the image information. An arrow of a solid line coupling between the DRPs shows the transmission direction of the identification number.

When the power of the image processing apparatus 12 is turned on, the CPU 32 first calculates the maximum identification number "3" based on the number of DRPs "4", and assigns the maximum identification number "3" to the DRP provided in the immediate right of the DRP provided at the left end of the substrate, as shown in an upper side of FIG. 15, for example. In FIG. 15, "No. 3" is shown in the DRP.

The DRP to which the identification number "3" is assigned transmits a value "2" acquired by decreasing or subtracting one from the identification number "3", to the DRP provided in the immediate left of the "No. 3" DRP, as shown by the arrow of the solid line. Hereby, the identification number "2" is assigned to the DRP. In FIG. 15, "No. 2" is shown in the DRP. Similarly, the DPR to which the identification number "2" is assigned executes the assignment process. However, no DRP and no wiring are provided in the immediate left of the "No. 2" DRP, and hence the "No. 2" DRP cannot transmit a value "1". The DPR to which the identification number "2" is assigned transmits information indicating that no DRP and no wiring are provided in the immediate left of the "No. 2" DRP, to the CPU 32.

The CPU 32 corrects the assignment of the maximum number, as shown in a lower side of FIG. 15. In this case, the CPU 32 assigns the maximum number to the DRP different from the DRP to which the maximum number has been assigned, again. For example, the CPU 32 assigns the maximum number to the DRP provided at the right end of the substrate. In the lower side of FIG. 15, "No. 3" is shown in the DRP.

Next, the DRP to which the identification number "3" is assigned transmits a value "2" acquired by decreasing or subtracting one from the identification number "3", to the DRP provided in the immediate left of the "No. 3" DRP, as shown by the arrow of the solid line. Hereby, the identification number "2" is assigned to the DRP. In the lower side of FIG. 15, "No. 2" is shown in the DRP. Similarly, each DPR of the substrate sequentially executes the assignment process. Hereby, the identification numbers "1" and "0" are assigned to the remaining DRPs of the substrate.

When the identification number is assigned to each DRP, the CPU 32 outputs the image information to the DRP of the identification number "0". The DRP of the identification number "0" executes the image process decided by the CPU 32 to the input image information, and transmits the image information after the execution of the image process to the DRP provided in the immediate right thereof, as shown by the arrow of the broken line. The DRP of the identification number "1" executes the image process decided by the CPU 32 to the input image information, and transmits the image information after the execution of the image process to the DRP provided in the immediate right thereof, as shown by an arrow of the broken line. Such processes are sequentially executed, so that the image processes based on the print job are completed. The image information to which the image processes are executed is output to the CPU 32.

Figure 18:
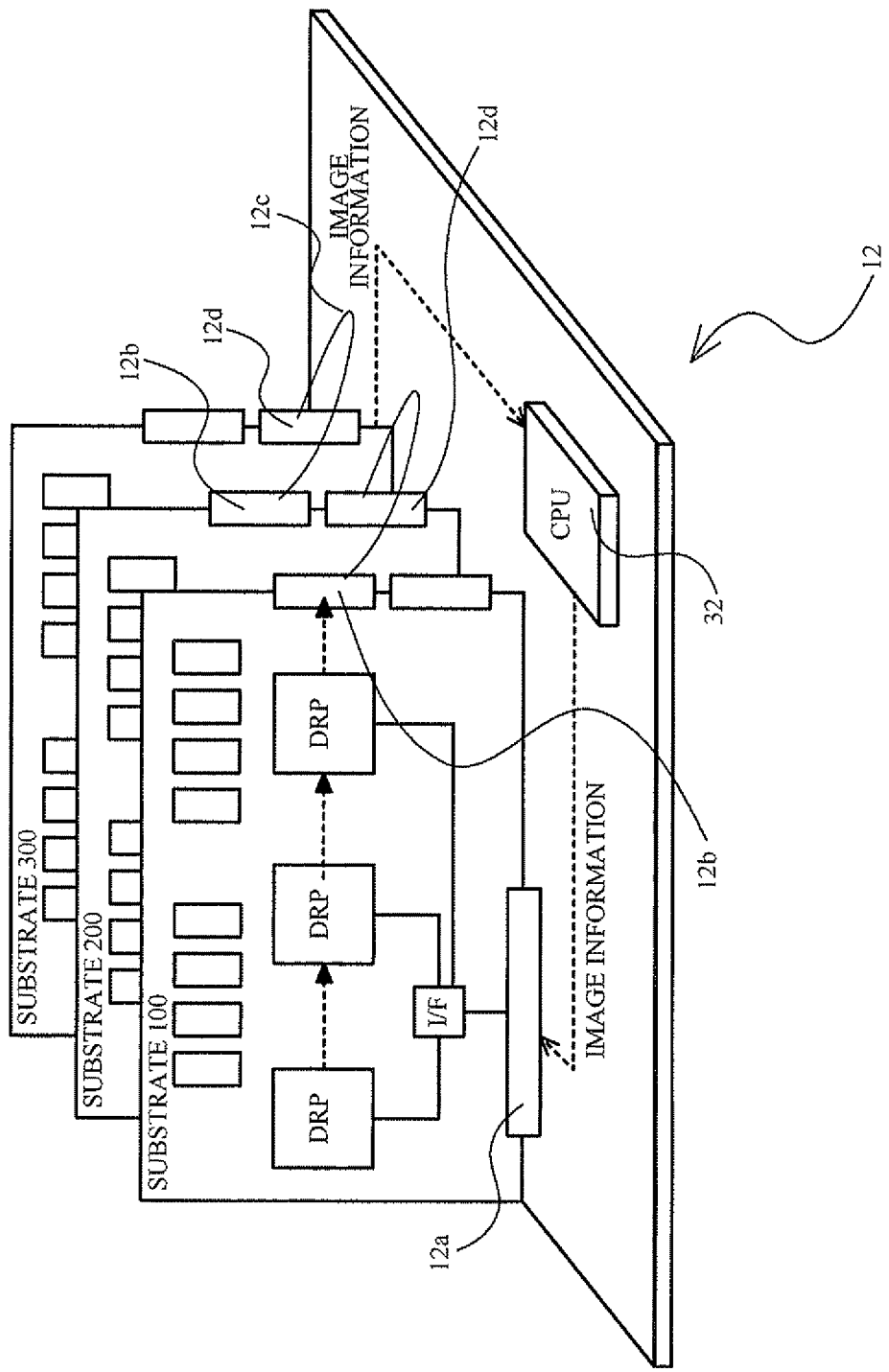
FIG. 18 is a perspective diagram showing connection relationship between substrates in the third assignment process.

FIGS. 16 and 17 are explanatory diagrams showing the third assignment process. FIG. 18 is a perspective diagram showing an example of connection relationship between substrates in the third assignment process. FIGS. 16 and 17 correspond to the above-mentioned flowcharts shown in FIGS. 10 to 12. In FIG. 16, three DRPs are located on each of three substrates, i.e., substrates 100, 200, and 300. The substrates 100, 200, and 300 are connected to the CPU 32 via connection terminals 12a. If the DRP of the final stage is not connected to the print data outputting unit 13, the number of substrates may be four or more.

As shown in FIG. 16, the DRP provided at the right end of the substrate 100 is connected to the DRP provided at the left end of the substrate 200. The DRP provided at the right end of the substrate 200 is connected to the DRP provided at the left end of the substrate 300. Specifically, a transmission terminal 12b of the substrate 100 is connected to a reception terminal 12d of the substrate 200 by wiring 12c, as shown in FIG. 18. Similarly, the transmission terminal 12b of the substrate 200 is connected to the reception terminal 12d of the substrate 300 by wiring 12c. Thus, the CPU 32 and the DRPs are connected like beads or a daisy chain. Thereby, the DRPs sequentially execute the image processes to the image information output from the CPU 32.

In FIG. 16, the marks "$" and "&" are shown in parts of the DRPs provided on the substrates 100, 200, and 300. The marks mean the connection information described above. For example, the mark "&" means the connection information relating to transmission. The mark "&" means the connection information relating to reception. Therefore, the DRP provided at the left end of the substrate 200 is a DRP of a reception side, and the DRP provided at the right end of the substrate 200 is a DRP of a transmission side. The same description is applied to the substrates 100 and 300. When the power of the image processing apparatus 12 is turned on, the connection information is set to corresponding DRPs.

When the information is set to corresponding DRPs, the CPU 32 communicates with each DRP of the substrates 100, 200 and 300, and acquires the contents of the connection information and the number of pieces of connection information from each substrate. Next, CPU 32 confirms whether a substrate in which the number of pieces of connection information in the single substrate is one and the contents of the connection information relate to the transmission exists. In FIG. 16, the substrate 100 corresponds to this condition. The CPU 32 assigns the maximum number to the DRP which is provided on the substrate 100 and has the connection information relating to the transmission. Therefore, the maximum number "2" is assigned to the DRP provided at the right end of the substrate 100.

Referring to FIG. 17, when the maximum number "2" is assigned to the DRP provided at the right end of the substrate 100, the "No. 2" DRP transmits the value "1" acquired by decreasing or subtracting one from the identification number "2", to the DRP provided in the immediate left of the "No. 2" DRP and on the substrate 100. The storage unit in the DRP provided at the center of the substrate 100 stores the received identification number "1". Similarly, when the identification number "1" is assigned to the DRP provided at the center of the substrate 100, the "No. 1" DRP transmits the value "0" acquired by decreasing or subtracting one from the identification number "1", to the DRP provided in the immediate left of the "No. 1" DRP and on the substrate 100. The storage unit in the DRP provided at the left end of the substrate 100 stores the received identification number "0".

When the DRP provided at the left end of the substrate 100 confirms that the identification number "0" is assigned to the DRP itself, the "No. 0" DRP transmits the value "1" acquired by adding one to the identification number "0", to the DRP provided in the immediate right of the "No. 0" DRP, i.e., the DRP provided at the center of the substrate 100. The transmission is executed through the transmission path of the image information. The DRP provided at the center of the substrate 100 receives the identification number "1". Since the identification number "1" is already set to the "No. 1" DRP, the "No. 1" DRP transmits the value "2" acquired by adding one to the identification number "1", to the DRP provided in the immediate right of the "No. 1" DRP.

The DRP provided at the right end of the substrate 100 receives the identification number "2". Since the identification number "2" is already set to the "No. 2" DRP, the "No. 2" DRP transmits the value "3" acquired by adding one to the received identification number "2", to the DRP provided at the left end of the substrate 200 through the wiring 12c. The DRP provided at the left end of the substrate 200 receives the identification number "3". Since the identification number "3" is not yet set to the DRP provided at the left end of the substrate 200, the DRP sets the identification number "3" to the DRP itself. The DRP provided at the left end of the substrate 200 transmits the value "4" acquired by adding one to the received identification number "3", to the DRP provided in the immediate right of the "No. 3" DRP.

By repeating the above-mentioned processes, the identification number is assigned to each DRP of the substrates 200 and 300. Hereby, the identification number "8" is set to the DRP provided at the right end of the substrate 300, as shown in FIG. 17. When the total of the number of DRPs included in the substrates 100, 200 and 300 is identical with a value acquired by adding one to the maximum identification number, the CPU 32 judges that the assignment process is success. In FIG. 17, the total of the number of DRPs is nine, and identical with the value acquired by adding one to the maximum identification number "8", so that the CPU 32 judges that the assignment process is success. The DRPs to which the respective identification numbers are assigned sequentially execute the image processes to the image information output from the CPU 32.

As described above, when the DRPs execute the image processes by the pipeline process mode, the identification number is assigned to each DRP. Thereby, the CPU 32 specifically recognizes the connection relationship of the DRPs.

The image processing apparatus 12 may be configured so as to use the reconfiguration process mode and the pipeline process mode using the above-mentioned description, together.

Figure 19:
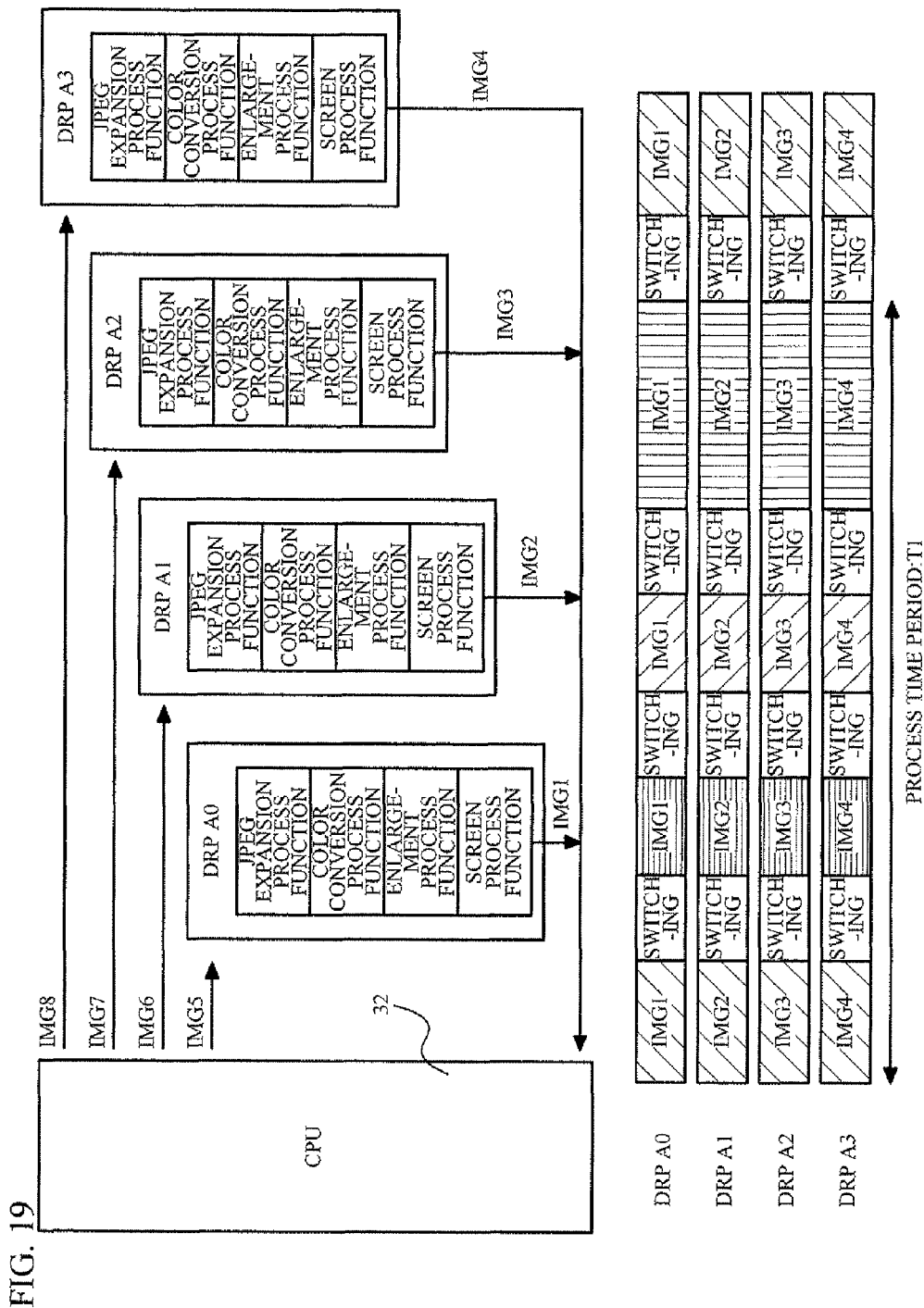
FIG. 19 is an explanatory diagram showing an example of a reconfiguration process mode.

A brief description will be now given of the reconfiguration process mode, with reference to FIG. 19. When DRPs A0 to A3 are placed on the substrate, for example, the CPU 32 sequentially switches the image process functions of the DRPs A0 to A3 in the reconfiguration process mode. An upper side of FIG. 19 shows that each of the DRPs A0 to A3 sequentially realizes the JPEG expansion process function, the color conversion process function, the enlargement process function, and the screen process function.

A lower side of FIG. 19 shows the above-mentioned image process functions by hatching. Specifically, the hatching with lines from top right to bottom left shows the JPEG expansion process function. The hatching with horizontal lines shows the color conversion process function. The hatching with lines from top left to bottom right shows the enlargement process function. The hatching with perpendicular lines shows the screen process function. The lower side of FIG. 19 shows that the process time period of the color conversion process is the same as that of the enlargement process, the process time period of the JPEG expansion process is longer than those of the above-mentioned processes, and further the process time period of the screen process is longer than that of the JPEG expansion process. The process time period requested for each image process in FIG. 20 described later is the same as that in FIG. 19.

In FIG. 19, the DRPs A0 to A3 first execute the JPEG expansion process to the image information IMG1 to IMG4 in parallel, respectively. The JPEG expansion process to the image information IMG1 to IMG4 is started simultaneously or virtually simultaneously, and then completed simultaneously or virtually simultaneously. The CPU 32 switches the JPEG expansion process function of the DRPs A0 to A3 to the color conversion process function. It takes a switching time period to switch the above-mentioned function. When the image process function is switched to the color conversion process function, the DRPs A0 to A3 execute the color conversion process to the image information IMG1 to IMG4 in parallel, respectively.

Similarly, the DRPs A0 to A3 realize the enlargement process function and the screen process function, and execute the enlargement process and the screen process to the image information IMG1 to IMG4 in parallel, respectively. When these image processes are completed, the DRPs A0 to A3 execute the same image processes (i.e., the JPEG expansion process, the color conversion process, the enlargement process, and the screen process) to the image information IMG5 to IMG8 in parallel, respectively. The process time period after the image processes to the image information IMG1 to IMG4 is started and until the image processes is completed is "T1"

Figure 20:
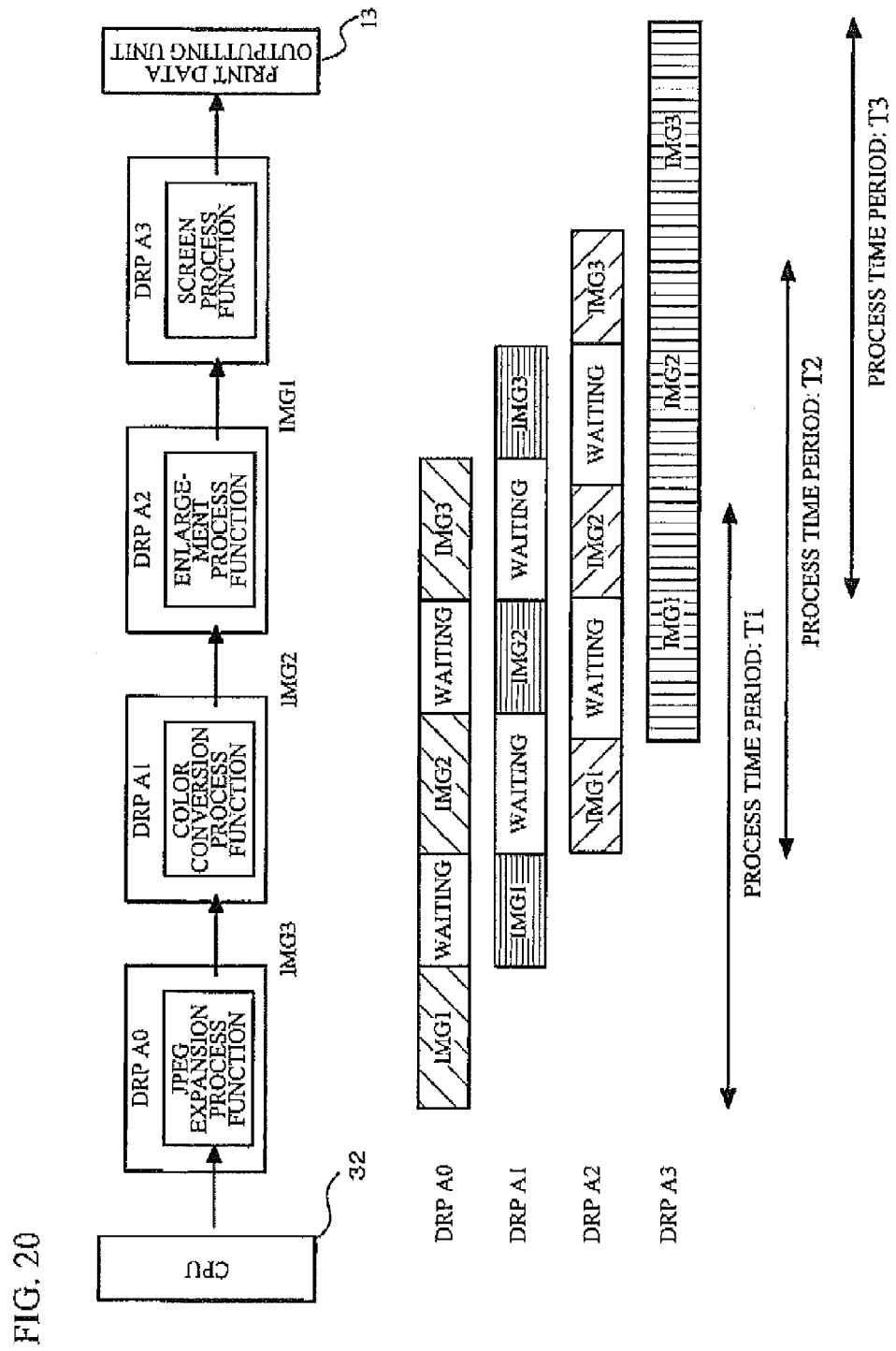
FIG. 20 is an explanatory diagram showing an example of the pipeline process mode.

A brief description will be now given of the pipeline process mode, with reference to FIG. 20. When the DRPs A0 to A3 are placed on the substrate, for example, the CPU 32 specifies the image process functions of the DRPs A0 to A3 in the pipeline process mode. In an upper side of FIG. 20, the DRP A0 realizes the JPEG expansion process function. The DRP A1 realizes the color conversion process function. The DRP A2 realizes the enlargement process function. The DRP A3 realizes the screen process function.

In FIG. 20, the DRP A0 first executes the JPEG expansion process function to the image information IMG1. Next, the DRP A1 executes the color conversion process function to the image information IMG1. Similarly, the DRP A2 executes the enlargement process function to the image information IMG1. The DRP A3 executes the screen process function to the image information IMG1. The image information IMG1 in which these image processes are completed is output to the print data outputting unit 13.

On the other hand, the DRP A0 which has completed the JPEG expansion process to the image information IMG1 waits during a given time period (hereinafter referred to as "waiting time period"), and then executes the JPEG expansion process to the image information IMG2. Further, the DRP A0 which has completed the JPEG expansion process to the image information IMG2 waits during the waiting time period, and then executes the JPEG expansion process to the image information IMG3. Similarly, each of other DRPs which has completed an assigned image process to the image information inputs subsequent image information, and completes the assigned image process to the subsequent image information in series.

Thereby, a process time period after the image processes to the image information IMG1 is started and until the image processes is completed is "T1". A process time period after the image processes to the image information IMG2 is started and until the image processes is completed is "T2". A process time period after the image processes to the image information IMG3 is started and until the image processes is completed is "T3".

In the reconfiguration process mode explained referring to FIG. 19 and the pipeline process mode explained referring to FIG. 20, the total of the process time periods of the image processes changes according to the contents of the print job. Therefore, the CPU 32 calculates the totals of the process time periods of the image processes by both process modes, and employs one of the process modes in which the result of the calculation is a shorter time period, so that the efficiency of the image processes improves as a whole.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
an assignment portion that, when a plurality of dynamic reconfigurable processors (DRPs) execute image processes by a pipeline process mode based on a print job, assigns identification numbers identifying the DRPs to the DRPs based on the number of DRPs;

a first change portion that changes an assignment process by the assignment portion, based on whether a DRP of a final stage in the DRPs is connected to an outputting portion, the outputting portion outputting the results of the image processes to an outside; and a second change portion that, when the DRP of the final stage in the DRPs is disconnected from the outputting portion, further changes the assignment process by the assignment portion based on whether the DRPs are placed on only a single substrate.

2. The image processing apparatus according to claim 1, wherein when the DRP of the final stage is connected to the outputting portion, the assignment portion calculates a maximum identification number based on the total of the number of DRPs, assigns the maximum identification number to the DRP of the final stage, and sequentially assigns values acquired by decreasing the maximum identification number to remaining DRPs other than the DRP of the final stage.

3. The image processing apparatus according to claim 2, wherein when the DRPs are placed on each of a plurality of substrates, the total of the number of DRPs is a value acquired by multiplying the number of DRPs by the number of substrates.

4. The image processing apparatus according to claim 1, wherein when the DRP of the final stage is disconnected from the outputting portion, and the DRPs are placed on only the single substrate, the assignment portion calculates a maximum identification number based on the number of DRPs, assigns the maximum identification number to any one of the DRPs, and sequentially assigns values acquired by decreasing the maximum identification number to remaining DRPs other than the DRP to which the maximum identification number is assigned.

5. The image processing apparatus according to claim 4, wherein when the assignment portion fails to confirm a minimum identification number based on the number of DRPs after the identification numbers are assigned, the assignment portion assigns again the maximum identification number to any one of the remaining DRPs other than the DRP to which the maximum identification number has been assigned, and sequentially assigns values acquired by decreasing the maximum identification number to remaining DR2s other than the DRP to which the maximum identification number is assigned.

6. The image processing apparatus according to claim 1, wherein when the assignment portion confirms a minimum identification number based on the number of DRPs, the assignment portion judges that the assignment process is success.

7. The image processing apparatus according to claim 1, wherein the identification numbers are assigned to the DRPs according to a direction opposed to a transmission direction of image information which is an object of the image processes.

8. The image processing apparatus according to claim 1, wherein when the DRP of the final stage is disconnected from the outputting portion, and the DRPs are not placed on only the single substrate, the assignment portion calculates a maximum identification number based on the number of DRPs placed on each substrate, and confirms the contents of connection information and the number of pieces of connection information of the DRPs for each substrate, the contents of connection information and the number of pieces of connection information of the DRPs being set based on connection relationship between the DRPs placed across substrates, and when the assignment portion confirms a substrate in which the number of pieces of connection information in a single substrate is one and the contents of the connection information relate to transmission, the assignment portion assigns the maximum identification number to the DRP having the connection information relating to transmission, sequentially assigns values acquired by decreasing the maximum identification number to remaining DRPs included in the substrate including the DRP with the assigned maximum identification number, and sequentially assigns values acquired by increasing the maximum identification number to remaining DRPs included in another substrate.

9. The image processing apparatus according to claim 8, wherein when the assignment portion confirms that the total of the number of DRPs placed across the substrates is identical with a value acquired by adding one to a maximum value acquired by increasing the maximum identification number, the assignment portion judges that the assignment process is success.

10. An image forming system comprising:
an image processing apparatus including:
an assignment portion that, when a plurality of dynamic reconfigurable processors (DRPs) execute image processes by a pipeline process mode based on a print job, assigns identification numbers identifying the DRPs to the DRPs based on the number of DRPs;
a first change portion that changes an assignment process by the assignment portion, based on whether a DRP of a final stage in the DRPs is connected to an outputting portion, the outputting portion outputting the results of the image processes to an outside; and
a second change portion that, when the DRP of the final stage in the DRPs is disconnected from the outputting portion, further changes the assignment process by the assignment portion based on whether the DRPs are placed on only a single substrate;
an outputting apparatus that outputs the print job to the image processing apparatus; and
a forming apparatus that forms an image on a sheet according to the output results of the image processing apparatus.

11. A non-transitory computer readable medium causing a computer to execute a process, the process comprising:
assigning, when a plurality of dynamic reconfigurable processors (DRPs) execute image processes by a pipeline process mode based on a print job, identification numbers identifying the DRPs to the DRPs based on the number of DRPs;
changing an assignment process by the assignment portion, based on whether a DRP of a final stage in the DRPs is connected to an outputting portion, the outputting portion outputting the results of the image processes to an outside; and
further changing, when the DRP of the final stage in the DRPs is disconnected from the outputting portion, the assignment process by the assignment portion based on whether the DRPs are placed on only a single substrate.

* * * * *